United States Patent
Sun et al.

(10) Patent No.: US 8,014,755 B2
(45) Date of Patent: Sep. 6, 2011

(54) SYSTEM AND METHOD OF MANAGING CONTACTLESS PAYMENT TRANSACTIONS USING A MOBILE COMMUNICATION DEVICE AS A STORED VALUE DEVICE

(75) Inventors: Albert Sun, Hsinchu (TW); Pao-Chieh An, Taipei (TW); Ying-Che Lo, Hsinchu (TW); Chee-Horng Lee, Hsinchu (TW); Chi-Wang Pang, Hsinchu (TW); Hung-Tsai Yen, Yijhu Township (TW)

(73) Assignee: Macronix International Co., Ltd., Hsinchu (TW)

( * ) Notice: Subject to any disclaimer, the term of this patent is extended or adjusted under 35 U.S.C. 154(b) by 672 days.

(21) Appl. No.: 11/753,408

(22) Filed: May 24, 2007

(65) Prior Publication Data

US 2008/0167988 A1    Jul. 10, 2008

Related U.S. Application Data

(60) Provisional application No. 60/883,747, filed on Jan. 5, 2007, provisional application No. 60/915,377, filed on May 1, 2007.

(51) Int. Cl.
*H04M 11/00*    (2006.01)

(52) U.S. Cl. .................. 455/406; 455/414.1; 455/556.1; 455/410; 705/26.1; 705/39; 705/40; 705/41; 705/44

(58) Field of Classification Search .................. 455/558, 455/557, 556.2, 556.1, 405, 406, 410, 414.1; 705/26, 39, 40, 41, 44
See application file for complete search history.

(56) References Cited

U.S. PATENT DOCUMENTS

| | | | |
|---|---|---|---|
| 4,899,036 | A | 2/1990 | McCrindle et al. |
| 5,521,363 | A | 5/1996 | Tannenbaum |
| 5,699,549 | A | 12/1997 | Cho |
| 5,920,847 | A | 7/1999 | Kolling et al. |
| 6,378,073 | B1 | 4/2002 | Davis et al. |
| 6,532,518 | B2 | 3/2003 | Mac.Smith et al. |
| 6,577,861 | B2 | 6/2003 | Ogasawara |
| 6,615,190 | B1 | 9/2003 | Slater |
| 6,731,199 | B1 | 5/2004 | Ueda et al. |

(Continued)

FOREIGN PATENT DOCUMENTS

EP    0 949 593    10/1999

(Continued)

OTHER PUBLICATIONS

3rd Generation Partnership Project; Specification of the SIM Application Toolkit for the Subscriber Identity Module-Mobile Equipment (SIM-ME) Interface (Release 1999), 3GPP TS 11.14 V8.17.0, 2004, 139 pp.

(Continued)

*Primary Examiner* — Kamran Afshar
*Assistant Examiner* — Mong-Thuy Tran
(74) *Attorney, Agent, or Firm* — Kenta Suzue; Haynes Beffel & Wolfeld LLP

(57) ABSTRACT

A method and apparatus handling payment transactions in a system using mobile communication devices as stored value devices are disclosed. A transaction operations server receives multiple records of the transaction from the stored value device—one via a communication channel through the telecommunication provider network, and another via an independent communication channel. The records are reconciled at the transaction server for transaction verification.

22 Claims, 22 Drawing Sheets

U.S. PATENT DOCUMENTS

| | | | |
|---|---|---|---|
| 7,072,864 | B2 | 7/2006 | Brake, Jr. et al. |
| 7,127,236 | B2 | 10/2006 | Khan et al. |
| 7,231,025 | B2 | 6/2007 | Labaton et al. |
| 7,280,981 | B2 * | 10/2007 | Huang et al. ............ 705/40 |
| 2002/0025796 | A1 | 2/2002 | Taylor et al. |
| 2002/0174071 | A1 | 11/2002 | Boudou et al. |
| 2002/0194135 | A1 | 12/2002 | Taylor et al. |
| 2003/0055735 | A1 | 3/2003 | Cameron et al. |
| 2003/0069787 | A1 * | 4/2003 | Tendon et al. ............ 705/14 |
| 2003/0130940 | A1 | 7/2003 | Hansen et al. |
| 2003/0172028 | A1 | 9/2003 | Abell et al. |
| 2003/0236872 | A1 | 12/2003 | Atkinson |
| 2004/0030601 | A1 | 2/2004 | Pond et al. |
| 2004/0068446 | A1 | 4/2004 | Do et al. |
| 2004/0235450 | A1 * | 11/2004 | Rosenberg ............ 455/406 |
| 2004/0243490 | A1 | 12/2004 | Murto et al. |
| 2005/0222961 | A1 | 10/2005 | Staib et al. |
| 2006/0097037 | A1 | 5/2006 | Sakamura et al. |
| 2006/0165060 | A1 | 7/2006 | Dua |
| 2006/0253335 | A1 | 11/2006 | Keena et al. |
| 2006/0287004 | A1 * | 12/2006 | Fuqua ............ 455/558 |
| 2009/0098825 | A1 * | 4/2009 | Huomo et al. ............ 455/41.1 |

FOREIGN PATENT DOCUMENTS

| | | |
|---|---|---|
| EP | 1 083 529 A2 | 3/2001 |
| EP | 1 221 669 A1 | 7/2002 |
| EP | 1 163 633 B1 | 6/2005 |
| EP | 1 553 510 A1 | 7/2005 |
| GB | 2 130 412 A | 5/1984 |
| JP | 2005-20173 | 1/2005 |
| KR | 20-2000-0034524 | 11/2001 |
| WO | 90-03016 | 3/1990 |
| WO | 97-45814 A1 | 12/1997 |
| WO | 99-53449 | 10/1999 |
| WO | 00-79411 A2 | 12/2000 |
| WO | 01-93139 A1 | 6/2001 |
| WO | 01-65499 | 9/2001 |
| WO | 02-063528 A1 | 8/2002 |
| WO | 03-021544 A1 | 3/2003 |
| WO | 2004-066228 A1 | 8/2004 |
| WO | 2004-112329 A1 | 12/2004 |
| WO | 2005-119606 A1 | 12/2005 |
| WO | 2006-085805 A1 | 8/2006 |

OTHER PUBLICATIONS

ISO 14443, An Introduction to the Contactless Standard for Smart Cards and Its Relavance to Customers, <http://www.otiglobal.com/objects/ISO%2014443%20WP%204.11.pdf>, created Oct. 2003, 9 pp.

ISO7816 (Part 1-3) Asynchronous Smartcard Information, http://ttfn.net/techno/smartcards/iso7816123.html, Part 1 2003, Part 2 1999, Part 3 2006, 29 pp.

ISO/IEC 7816 Part 4: Interindustry Command for Interchange, http://www.ttfn.net/techno/smartcards/iso7816_4.html, 1995, 106 pp.

Short Message Service, http://en.wikipedia.org/wiki/Short_message_service, downloaded Nov. 11, 2006, 16 pp.

"Digital Cellular Telecommunications System (Phase 2+); Subscriber Identity Modules (SIM); Functional Characteristics (GSM 02.17 version 8.0.0 Release 1999)," ETSI TS 100 922 V8.0.0 (Apr. 2000), www.etsi.org, 2000, 13 pp.

* cited by examiner

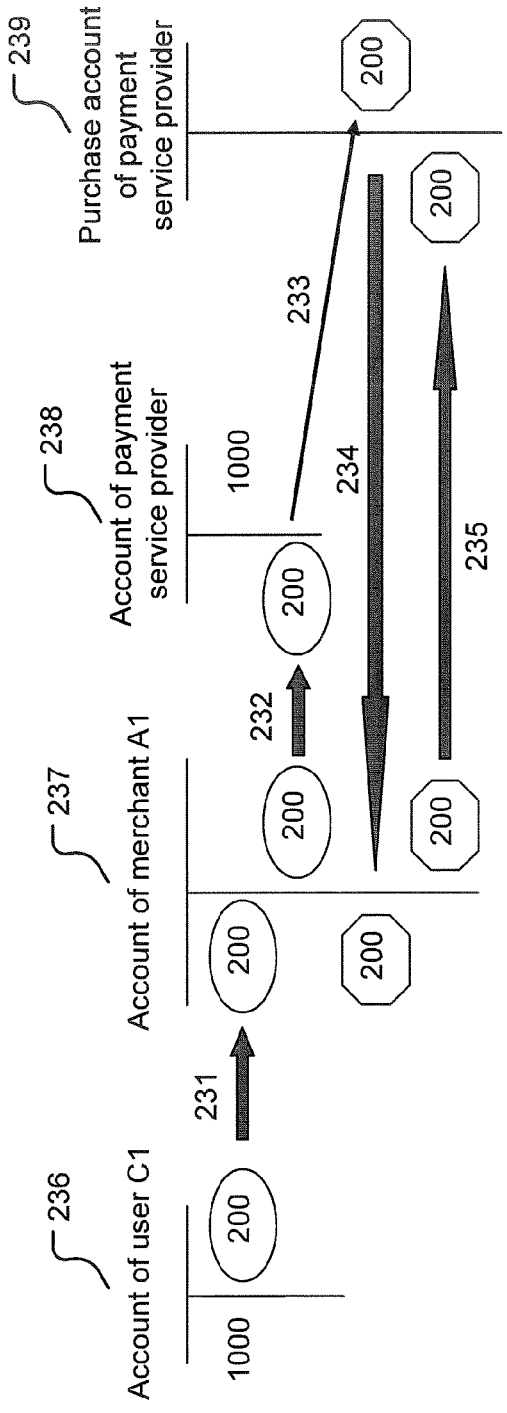
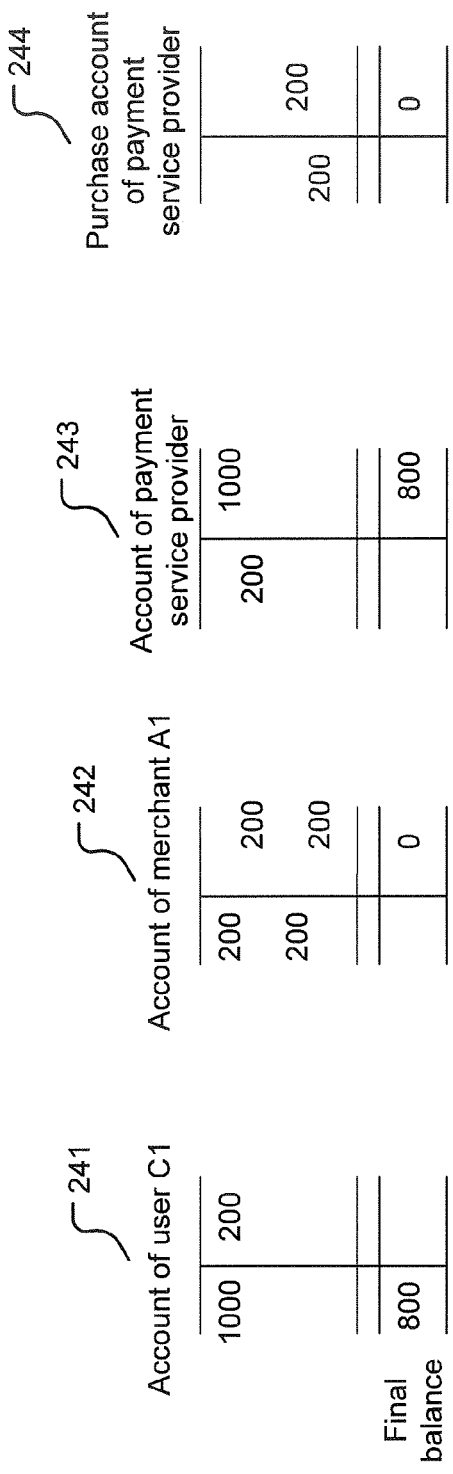

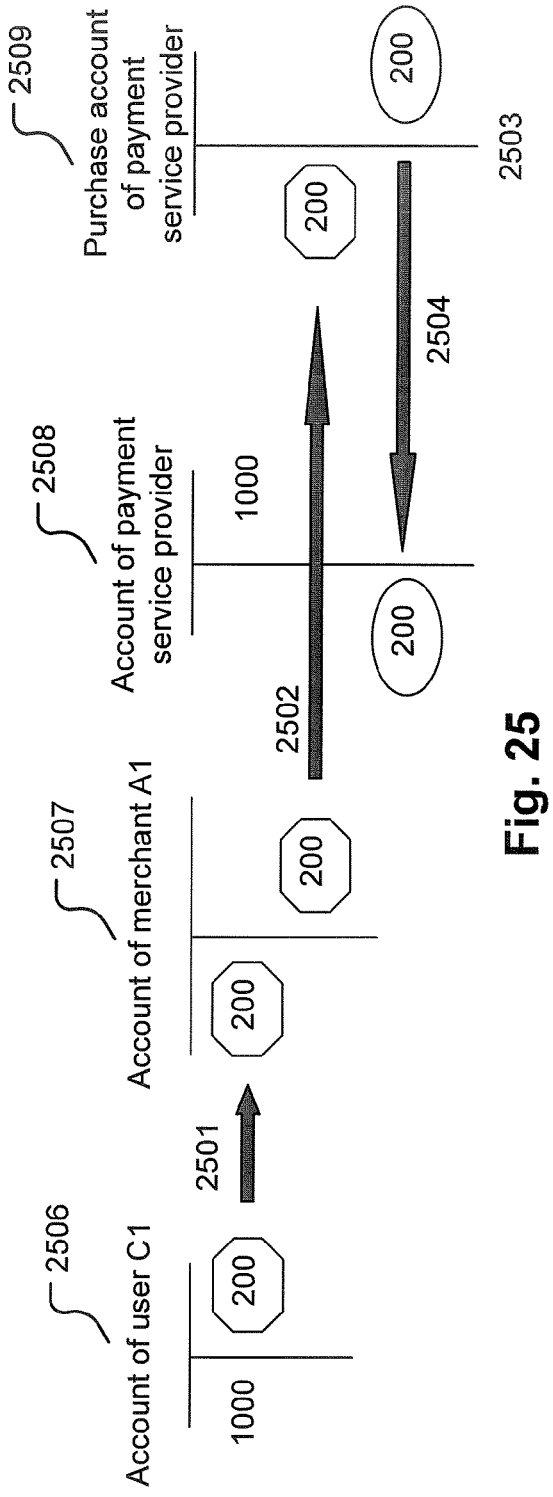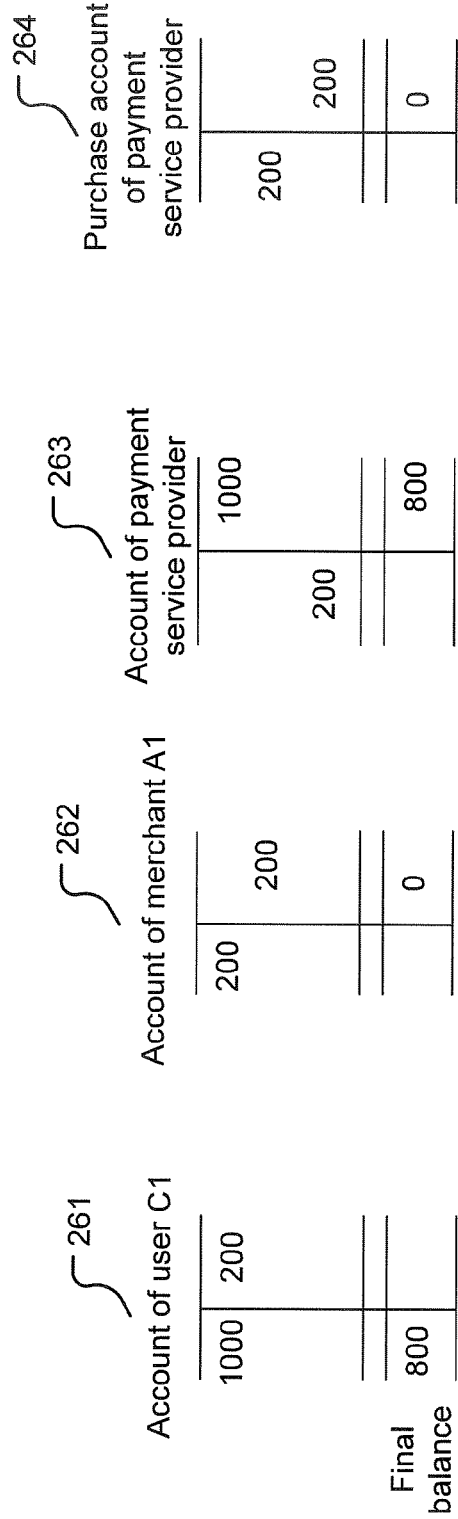
Fig. 25
Fig. 26 ial Application No. 60/883,747 filed 5 Jan. 2007, and U.S. Provisional Application No. 60/915,377, filed 1 May 2007, which are incorporated by reference.
SYSTEM AND METHOD OF MANAGING CONTACTLESS PAYMENT TRANSACTIONS USING A MOBILE COMMUNICATION DEVICE AS A STORED VALUE DEVICE

CROSS-REFERENCE TO RELATED APPLICATIONS

The present application claims the benefit of U.S. Provisional Application No. 60/883,747 filed 5 Jan. 2007, and U.S. Provisional Application No. 60/915,377, filed 1 May 2007, which are incorporated by reference.

BACKGROUND

1. Field of the Invention

The present invention relates to mobile commerce, and more particularly electronic payment systems for portable communication devices that act as smart cards.

2. Description of Related Art

Because of the widespread adoption of mobile telephones and of the benefits attributed to the emerging smart card technology for use as stored value devices, there is considerable interest in adapting mobile telephones using smart card technology for use as stored value devices. United States Patent Publication No. 2006/0097037A1, entitled Electronic Value Transfer Device Equipped with Non-Contact IC Interface, by Sakamura, et al. describes one system taking advantage of the smart card technology combined with mobile terminals such as cell phones.

The use of portable electronic devices as smart cards that store value creates a new class of security problem, because of inability to control access to and tampering with the smart cards. Computer-based security technology, including encryption and authentication systems can limit the exposure to tampering. However, consumer trust in such computer-based security technology is low. Also, the incentives for breaking through the computer-based protection grow as the value stored on the device increases.

In addition, the financial transaction networks used for mobile commerce architectures have been dominated by the banking system and communication system providers. This reliance on existing banking and telecommunication provider networks limits the flexibility and has impeded widespread development and use of the technology.

It is desirable to provide an architecture for mobile commerce that reduces the exposure to tampering with mobile communication devices and fraudulent use of the electronically stored money, while also reducing the dependence on access to the banking and telecommunication provider system networks.

SUMMARY OF THE INVENTION

A system architecture is described for managing transactions that use a mobile communication device, like a cellular telephone or another similar device. Mobile communication devices used in the architecture described herein are characterized by secure memory usable for storing value and a controller which manages the secure memory. The controller on the mobile communication device supports communication links for the purposes of managing data in the secure memory by at least two independent media, including a protocol executed via a telecommunication provider network and a secure protocol preferably via a short range medium using a wireless proximity coupling device or other type communication link, with a transaction terminal in proximity with the mobile communication device. In one example, the protocol executed via the telecommunication provider network may be compliant with an industry standard data communication protocol like an email protocol or a Short Message Service SMS protocol defined in GSM recommendation 03.40. Also, in one example, the secure protocol executed for communication with a wireless proximity coupling device at the transaction terminal may be a contactless protocol as contemplated by industry standard ISO 14443. The stored value device may be implemented for example like a smart card as contemplated by industry standard ISO7816 or other similar technologies According to the system architecture described herein, a transaction operation server communicates with both a transaction terminal and a telecom interface terminal. A telecom interface terminal in the system described herein manages communication channels through the telecommunication provider network between the transaction operation server and the mobile communication devices utilizing the system. The transaction terminal, which may be a stand-alone computer, point of sale device or network, or another mobile communication device, is configured using secure memory technology to prevent tampering with programs or data by the merchants or other people having access to the terminals. The transaction operations server is configured to execute specific application programs which can be tailor-made for individual transaction terminals particularly at merchant sites, utilizing a highly secure and trusted communication environment, such communications based on the public key infrastructure PKI. Also, for any transaction that involves changes to application programs or data that affects the use of the transaction terminal or contents in the stored value device, highly secure authentication/approval/ciphering techniques can be executed over the communication links between the transaction operation server and the transaction terminals. Transactions for value, or for changing programs or data stored on the mobile communication device, are secured by a protocol between the transaction terminal and the mobile communication device using the secure protocol for communication with the reader.

Transactions for value executed according to the architecture described herein include purchasing goods from merchants, purchasing electronic (virtual) coupons or tickets to entertainment events that can be stored on the communication device, purchasing services, transferring funds in the form of electronic checks, electronic coupons and electronic tickets to other mobile communication devices, redeeming electronic checks, coupons or tickets to entertainment events, and so on.

The controller on the mobile communication device is configured to deliver transaction records or other records for the purposes of accounting and verification to the transactions operation server, at the time of transactions and/or periodically independent of actual transaction times, using a communication channel through the telecommunication provider network. Data delivered via the communication channel through the telecommunication provider network is used as a second source of validation of actual transactions executed using transaction terminals, and to provide information that can be used to detect tampering with the secure memory on the mobile communication device.

Interfaces with the banking network are managed by the operations server, which includes an account registration service to establish user accounts, and maintains the necessary links with the banking network for transferring value from banking accounts to the stored value accounts on the mobile communication devices.

The user can add value to the stored value device and redeem value from the stored value device through a transaction terminal, while the mobile communication device is in both online and off-line modes. When the mobile communication device operates in an online mode, it acts as an interactive terminal for the user accessing a web portal associated with the operations server, which redirects the access to a merchant site or otherwise presents an online interface for the user of the mobile communication device. The operation servers can act in real time to settle transactions in the online mode. When the mobile communication device operates in an off-line mode, the individual merchant in possession of the transaction terminal used for the off-line transaction is responsible for the value transferred to the mobile communication device relying on the credit of the individual holding the mobile communication device, for example by treating the transaction like a transaction for the sale of gift cards. For off-line transactions, the individual merchant can rely on the credit card network or require cash for transactions requiring delivery of value to the mobile indication device. Furthermore, the transaction terminal is configured to deliver transaction records and other records for the purposes of accounting and verification to the transactions operation server using a secure channel between them, at the time of transactions and/or periodically independent of actual transaction times.

One possible method for handling payment transactions in a system as described above includes:

storing data representing an amount of money on secure memory in a mobile telephone;

establishing a link between the mobile telephone and a transaction terminal in proximity with the mobile telephone;

executing communications between the mobile telephone and the transaction terminal using the link to change the amount of money represented by the data stored in the mobile telephone according to a particular transaction;

passing a first record of the particular transaction from the mobile telephone to an operation server via a first communication channel through the telecommunication provider network;

passing a second record of the particular transaction from the transaction terminal to the operation server via a second communication channel through a communication network coupled to the transaction terminal and the operation server; and reconciling the first and second records at the operation server to verify the particular transaction.

Another possible method for handling payment transactions in a system as described above changes the stored value represented by data on the mobile communication device according to the particular transaction, and is initiated by at least partly wireless communication between the mobile communication device and the transaction terminal, and includes:

receiving, at the transaction operations server, a first record of the particular transaction from the mobile communication device via a first communication channel through the telephone service provider network;

receiving, at the transaction operations server, a second record of the particular transaction from the transaction terminal via a second communications channel through a communication network coupled to the transaction terminal; and reconciling the first and second records at the transaction server to verify the particular transaction.

The first record may be transmitted at the time of the particular transaction, or consolidated with records of other transactions executed over a period of time, and reported at times independent of the particular transaction. Likewise, the second record may be transmitted at the time of the particular transaction, if for example the transaction terminal is online at the time of the particular transaction, or consolidated with other transaction records and reported at times independent of the particular transaction, if for example the transaction terminal is off-line at the time of the particular transaction. The reconciliation of the first and second records at the operation server allows for strong verification of the actual transactions, for detection of tampering with the mobile communication device, with the secure stored value memory, and for detection of tampering with transaction terminals.

A data processing system acting as a server for mobile payment, a mobile communication device, and a data processing system acting as a transaction terminal are described which supports a mobile payment architecture described herein. Thus, a data processing system acting as an operations server supporting mobile payment as described herein comprises the data processor that includes program storage storing programs executable by the data processor and having communication resources supporting a plurality of communication protocols, including for example protocols which are executable supporting links through the telecommunication provider network to a mobile communication device, and protocols that are executable over the Internet. Programs on the operations server include a program adapted to control a transaction involving changing stored value on a mobile communication device. Thus, a representative program on the operations server includes:

sending data representing a stored value to the mobile communication device;

receiving a first record of a particular transaction from the mobile communication device via a first communication channel through a telephone service provider network;

receiving a second record of the particular transaction from the mobile communication device via a transaction terminal via a second communications channel through a communication network coupled to the transaction terminal;

reconciling the first and second records to verify the particular transaction; and updating an account associated with the particular transaction.

Another program on the operation server is adapted to receive periodically transmitted stored value audit records delivered from mobile devices via the telecommunication provider network to the operation server. The operation server also includes programs adapted to review and monitor the stored value audit records and account activity to detect fraud or tampering with the stored value memory on the mobile devices, and to otherwise improve security of the mobile payment system.

Another program on the operation server control particular transactions initiated by at least partly wireless communication between 1) a mobile communication device having a stored value represented by data on the mobile communication device and 2) a transaction terminal. The program instructions perform the following:

receiving, at the transaction operations server, a first particular transaction of the mobile communication device, wherein the first transaction adds a first amount of money to the stored value represented by data on the mobile communication device, and wherein the first amount of money is in a first data type representing a first business issued currency honored by a first group of one or more businesses;

receiving, at the transaction operations server, a second particular transaction of the mobile communication device, wherein the second transaction subtracts a second amount of money from the stored value represented by data on the mobile communication device, and wherein the second amount of money is in a second data type representing a second business issued currency honored by a second group of one or more businesses;

exchanging, at the transaction operations server, at least part of the money represented by data on the mobile communication device between the first data type and the second data type.

Another programs executed by the data processing system including instructions to maintain an accounting database to keep records of the plurality of data types including the first data type and the second data type, each of the plurality of data types representing currency issued by a group of one or more businesses. The accounting database also keeps records of customers of a plurality of providers of communication services for mobile communication devices, such as Internet service providers or telecommunications service providers. The records include billing records to be sent from the data processing system to data processors of the plurality of providers of communication services.

The data processing system flexibly operates with different electronic money systems. Accordingly, the exchange of money occurs either with an account of a payment services provider operating the transactions operations server, or a merchant honoring electronic money. To help support a range of different electronic currencies and agreements between payment service providers, business groups, and communications service providers, the exchange ratio between any two electronic currencies can be set at 1:1 or some other ratio. The settlement system is similarly flexible. The exchange of money is credited to the account of a user of the mobile communications device. Alternatively, money to be exchanged is taken from the account of a user of the mobile communications device. In another example, in a transaction where the user of a mobile communications device spends a portion of stored value at a merchant, the exchanged money is directly credited to account of a payment services provider, or credited to the payment services provider following a credit wand debit of the exchanged money with an account of the merchant.

In addition, a mobile communication device as described herein comprises a data processor that includes program storage storing programs executable by the data processor and having data communication resources supporting a plurality of communication protocols including at least one protocol supported by a telecommunication provider network and at least one protocol for wireless proximity coupling. In addition, programs on the mobile communication device are adapted to maintain stored value in memory accessible by the data processor, to support authentication of the mobile communication device for communications with transaction terminals, to communicate with a transaction terminal via wireless proximity coupling, and to communicate with a server via the telecommunication provider network. The programs on the mobile communication device also include a program adapted to execute a transaction involving changing stored value on the mobile communication device. Thus, a representative program on the mobile communication device includes:

storing data representing a stored value on the mobile communication device;

establishing a wireless link between the mobile communication device and a transaction terminal;

executing communications between the mobile communication device and the transaction terminal using the wireless link to change the stored value represented by the data stored on the mobile communication device according to a particular transaction; and passing a first record of the particular transaction from the mobile communication device to a transaction operations server via a first communication channel through the telephone service provider network for reconciliation with a second record of the particular transaction sent to the transaction operations server via a second communications channel through a communication network coupled to the transaction terminal.

An example memory has program instructions for a mobile communication device to execute transactions. The program instructions comprise the mobile communication device storing data representing a stored value in memory on the mobile communication device;

the mobile communication device establishing a wireless link between the mobile communication device and a transaction terminal;

the mobile communication device executing communications using a wireless proximity coupling link between the mobile communication device and a transaction terminal to authenticate the mobile communication device and to change the stored value represented by the data stored on the mobile communication device according to a particular transaction involving changing stored value on the mobile communication device;

the mobile communication device passing a first record of the particular transaction from the mobile communication device to a transaction operations server via a first communication channel through the telephone service provider network for reconciliation with a second record of the particular transaction sent from the mobile communication device to the transaction operations server via a second communications channel through a communication network coupled to the transaction terminal.

In addition, a program on the mobile communication device is operable to enable the mobile communication device to act as a transaction terminal for transferring stored value between mobile communication devices. Another program on the mobile communication device is operable to periodically transmit stored value audit records via the telecommunication provider network to the operation server. The stored value audit records can be used to monitor activity of the stored value on the mobile communication device, detect fraud or tampering with the stored value, and provide additional verification for legitimate transactions. Programs involved in the mobile payment system are stored in the mobile communication device preferably in memory which is protected from tampering, and managed only by programs authorized via the operation server or otherwise by authorized personnel.

A transaction terminal is described herein supporting mobile payment comprising a data processor including program storage storing programs including instructions executable by the data processor, and having communication resources supporting a plurality of communication protocols, including at least one protocol for data communications with the server and at least one protocol for short range links, such as wireless proximity coupling. Programs on the transaction terminal are adapted to maintain records in memory of transactions involving transfer of stored value on mobile communication devices, to authenticate a mobile communication device for communications via the wireless proximity coupling, and to communicate with the server for settlement of accounts based on the records of transactions. Also, a representative program on the transaction terminal includes:

receiving data representing a stored value from the mobile communication device using the wireless proximity coupling; and passing a record of the particular transaction to a transaction operations server via a communications channel through a communication network for reconciliation with a second record of the particular transaction sent from the mobile communication device to the transaction operations server via a communication channel through the telephone service provider network.

In addition, the transaction terminal in some embodiments a includes a card reader, and programs on the transaction terminal include a program to read a credit or debit card, and to process a request to add stored value to a mobile communication device via the wireless proximity coupling, based on processing the credit or debit card, by transferring stored value to the mobile communication device.

Other aspects and advantages of the present invention can be seen on review of the drawings, the detailed description and the claims, which follow.

BRIEF DESCRIPTION OF THE DRAWINGS

FIG. 23 illustrates a money flow among condensed accounts of credits and debits associated with the transaction of FIG. 22.

FIG. 24 illustrates condensed accounts of credits and debits associated with the money flow of FIG. 23.

FIG. 25 illustrates an alternative money flow among condensed accounts of credits and debits associated with the transaction of FIG. 22.

FIG. 26 illustrates condensed accounts of credits and debits associated with the money flow of FIG. 25.

DETAILED DESCRIPTION

A detailed description of embodiments of the present invention is provided with reference to the FIGS. 1-26.

Figure 1:
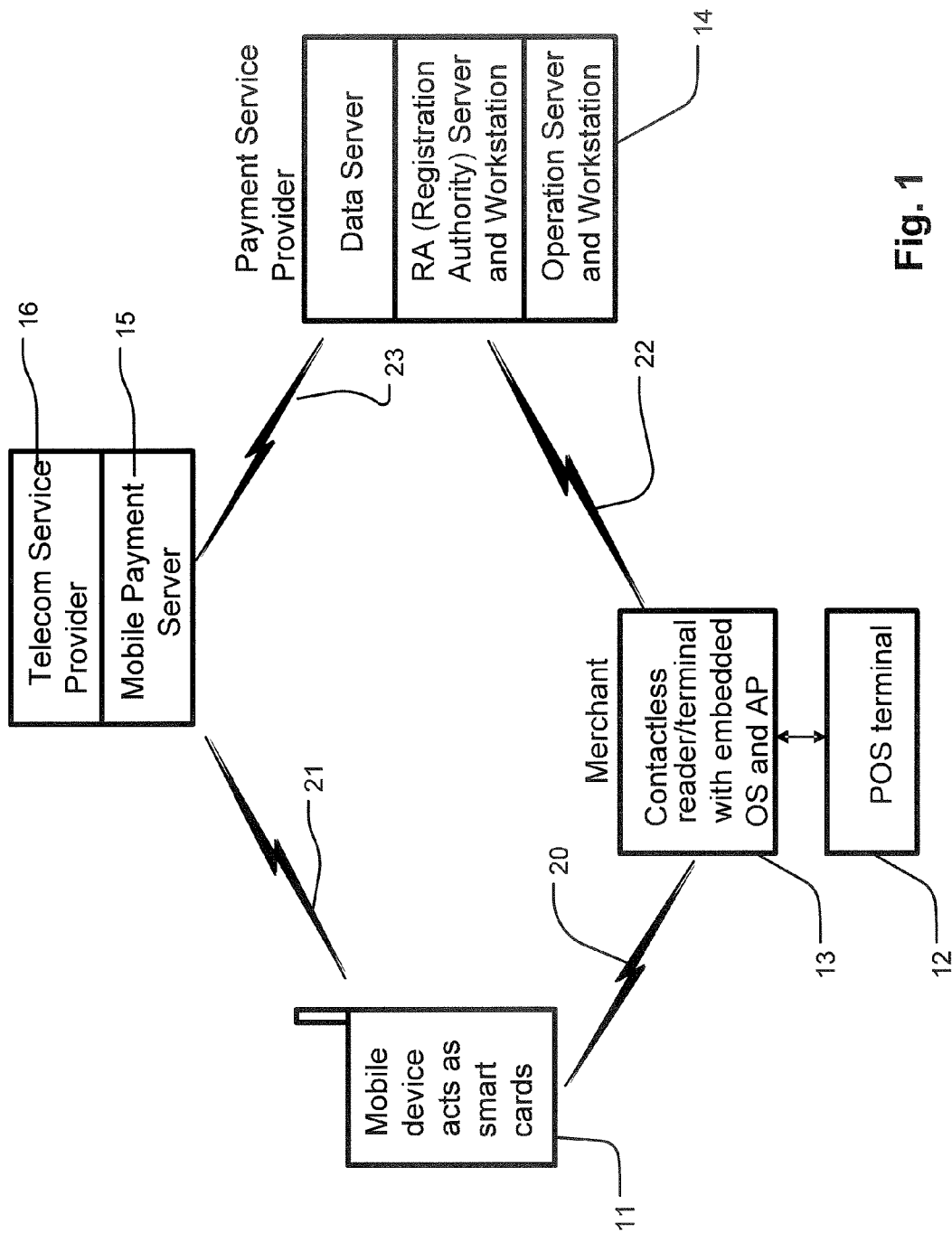
FIG. 1 is a block diagram of a system architecture as described herein.

FIG. 1 illustrates a basic system architecture for mobile payment systems as described herein. A mobile communication device 11 including a stored value memory is configured to establish two independent wireless links, including link 20 with a reader/terminal 13 including resources needed to act as a transaction terminal, and link 21 with a telecom interface server 15 through the telecommunication service provider switch 16, or alternatively a router, computer, or other electronic device. Examples of the mobile communication device 11 are a mobile phone or other handset, PDA, computer, or other electronic device. The link 20 is established for example using the short-range wireless technology complying with the industry standard ISO 14443 for secure wireless communication between devices in close proximity. According to the system described herein, the link 20 is used for charging and recharging the stored value in the mobile communication device, and for other secure transactions such as updating programs used for management of the stored value memory on the device. The link 21 is established over the telecommunication provider network using a protocol such as SMS, 802.11b/g, GSM, PHS, or other data transmission protocols available on that network. For example, the device 11 may be configured to communicate using SMS messages with a telecom interface server 15 coupled with the telecommunication service provider switch 16. The link 21 is used for passing transaction records via the telecom interface server 15 to the operation server 14. The transaction terminal in the reader/terminal 13 in the illustrated example is coupled to a point-of-sale terminal 12 which can be implemented using typical point-of-sale terminal technology, including personal computers, cash registers and the like. In the illustrated embodiment, the reader/terminal 13 includes resources for acting as a transaction terminal in the mobile payment system described herein with embedded operating system and application programs stored in secure memory to prevent tampering with the programs by merchants or other people having access to the devices. In other embodiments, the reader in the reader/terminal 13 may be integrated with the point-of-sale terminal 12, mobile phone or other handset, or other electronic device.

The transaction terminal, using the embedded operating system and application programs in the contactless reader/terminal 13 in this embodiment, establishes communications via a link 22 with the operation server 14 for the mobile payment system architecture.

The operation server 14 includes a database server, a registration authority and basic operations management server components. The operation server 14 provides an account system that handles the participants' assets (i.e. e-gifts) central to the payment service provider network described herein. The basic operations management server components protect the participants' assets with high security policies. An implementation of the account system includes a book-entry mechanism to present stored value amounts to customers and merchants, and to transfer values between accounts, like account management in a typical bank account. The operation server 14 is configured to operate in an on-line mode, with active communication links between the operation server 14 and the financial system network, and in an off-line mode disconnected from the financial system network. In the off-line mode, resources on the operation server 14 simulate or act in place of a central bank in the financial system network, acting as a final settlement institute for stored value transactions. The operation server also includes programs adapted to review and monitor the stored value audit records and account activity to detect fraud or tampering with the stored value memory on the mobile devices, and to otherwise improve security of the mobile payment system. For example, stored value audit records are reconciled with account activity in the records of account maintained by the operation server for each user. Also, a program on the operation server can monitor the receipt of stored value audit records, to insure that each mobile communication device delivers a stored value audit record to the operation server within specified periods of time, to insure that the devices are properly operating.

The telecom interface server 15 establishes communications link 23 with the operation server 14, such as via the Internet or an ADSL or other wired connection. The link 22 is used for forwarding transaction records, either individually or in batches, from the transaction terminal to the operation server 14, and for transferring data from the operation server 14 to the transaction terminal for the purposes of upgrading application programs, key exchange for secure dated transactions, and transferring credit to the transaction terminal according to the transactions with the users. The link 23 is used for forwarding transaction records, either individually or in batches, to the operation server 14, which have been received at the telecom interface server 15 via the channel using the telecommunication provider network from the mobile communication device. Link 23 is also used for transferring management data from the operation server 14 to the telecom interface server 15 in support of the system.

The architecture described in FIG. 1 provides for transaction records to be delivered to the operation server 14 from the telecom interface server 15 and from the transaction terminal 13. The transaction records from the two sources can be used to confirm the transactions, improve transaction and stored value integrity, detect tampering with the mobile communication devices and transaction terminals, and otherwise provide for highly reliable settlement results.

Figure 2:
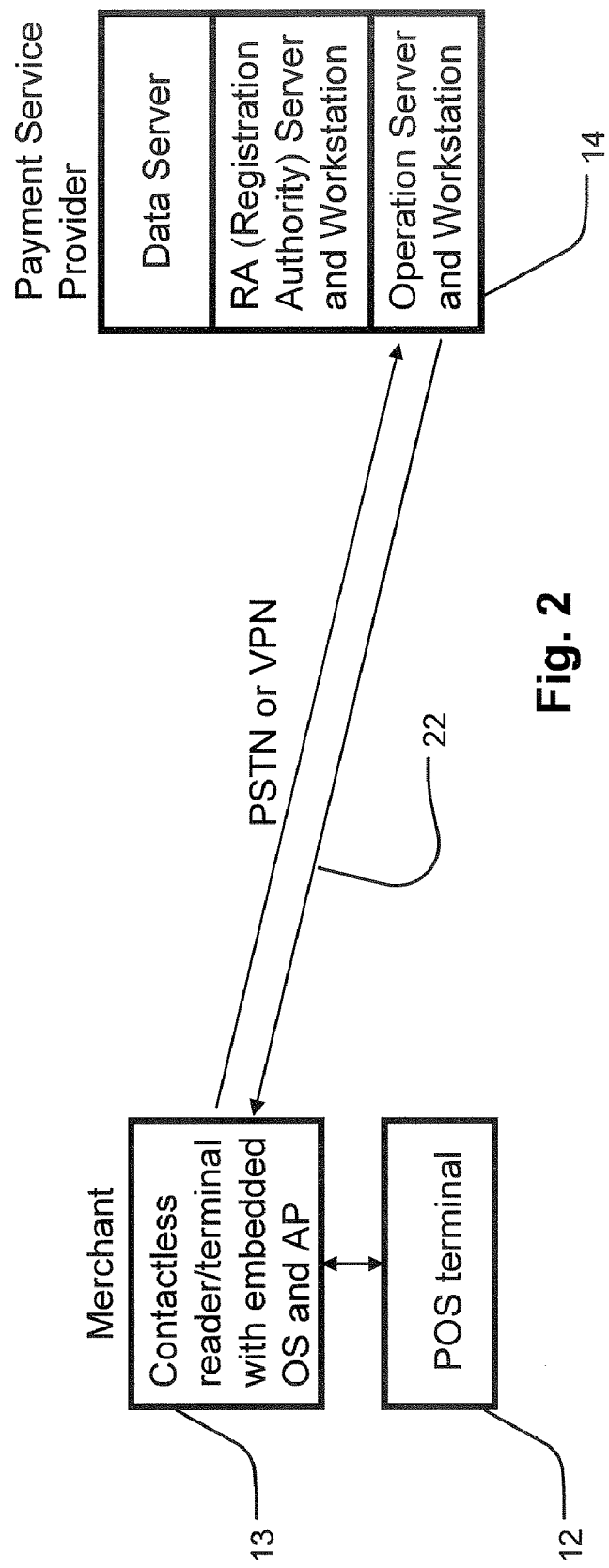
FIG. 2 illustrates a configuration of a communication link between a transaction terminal and an operation server in a system as described in FIG. 1.

FIG. 2 illustrates the link 22 between the reader/terminal 13 and the operation server 14. In representative embodiments, the link 22 may be established using so-called virtual private network VPN technology over the Internet, or other secure technology such as might be provided via the public switched telephone network PSTN. According to a typical interchange between the reader/terminal 13 and the operation server 14, the contactless reader/terminal 13 passes a batch of transaction records to the operation server 14 over a certain period of time or upon request by the operation server 14 for settlement.

The contactless reader/terminal 13 passes a recharge request to the operation server 14 for authentication if there is a mobile communication device requesting an online recharge of the stored value at the merchant through the contactless reader/terminal 13. The contactless reader/terminal may allow off-line recharge. In this case, the off-line recharge is accomplished without connecting to the operation server 14 for authentication. The transaction is dependent on the credit of each mobile communication device holder with the merchant. The merchant may rely on the credit card network or other resources to verify the credit.

Through the connections between the operation server 14 and individual contactless reader/terminals (terminal 13), the operation server 14 is able to upgrade application programs in the individual reader/terminals and in the mobile communication devices, update the data used by the reader/terminals, including processing fees, prices of specific products on sale, coupons for specials within a certain period and so forth. In addition, the operation server 14 is able to credit the reader/terminals for off-line transactions using secure connections.

According to the structure described, the operation server 14 is able to differentiate each merchant and each transaction terminal 13, and apply a different application program, different data and recharge quotas, and support other terminal specific characteristics for execution of mobile payment transactions. In addition, the system is able to handle the roaming of the mobile communication device 11. In particular, as the mobile communication device 11 moves from terminal to terminal, the operation server 14 is able to track the device, provide correct application programs or other data needed for transactions with a particular device, and to apply such local variables as exchange rates for each transaction using a particular mobile communication device.

Figure 3:
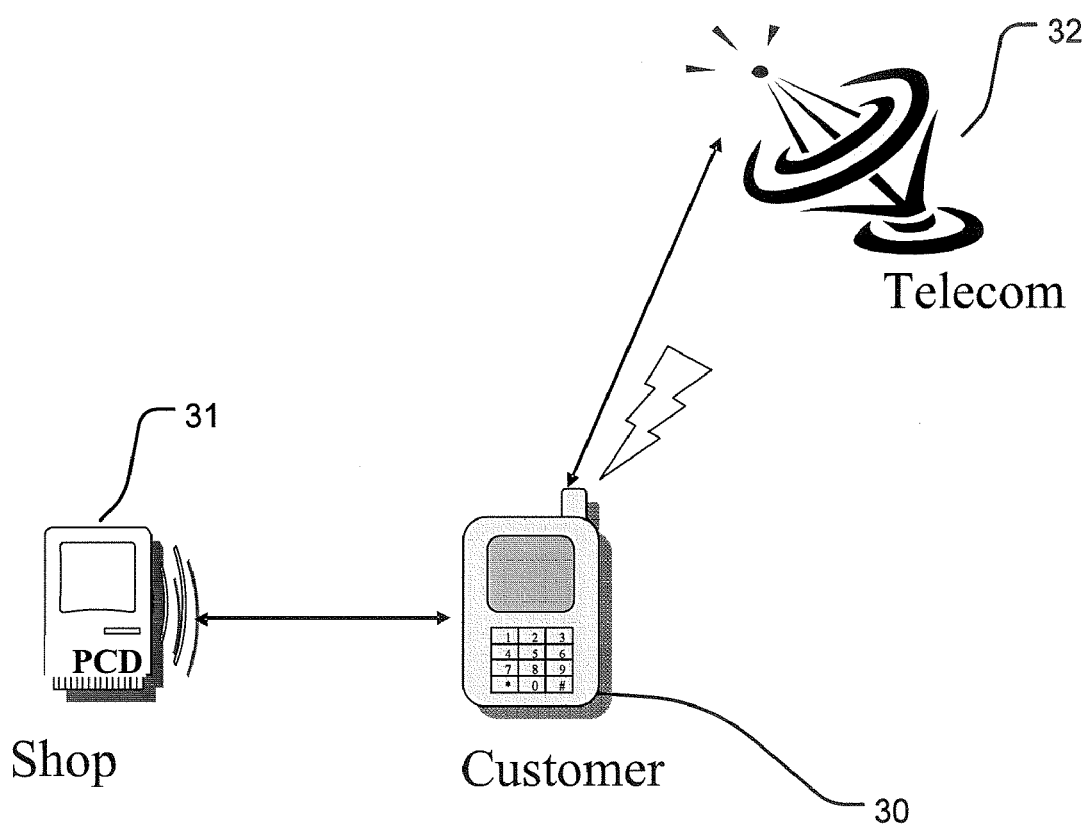
FIG. 3 illustrates a mobile communication device capable of communicating by two independent communication media, including a telecommunication service provider network and a medium for a link to a transaction terminal in proximity with the mobile communication device.

FIG. 3 illustrates a basic characteristic of a mobile communication device used in an architecture as described herein. The mobile communication device 30 comprises a communications device capable of communication on two independent media, including a telecommunication provider network 32 and a proximity communication medium, including wireless media, such as for example is established with a proximity coupling device PCD 31 compliant with an industry standard ISO 14443 smart card technology. The mobile communication device may be a standard cellular telephone, a personal digital assistant, or other mobile communication technology capable of including a controller and secure memory which support transactions affecting data stored in a secure memory using two independent media as described herein. The mobile communication device 30 may be configured with a subscriber identity module SIM, and adapted to be compatible with commands and procedures complying with the industry standard SIM Application Toolkit (3GPP TS 02.17: "Subscriber Identity Modules (SIM) Functional characteristics") promulgated by the 3rd Generation Partnership Project (3GPP).

Figure 4:
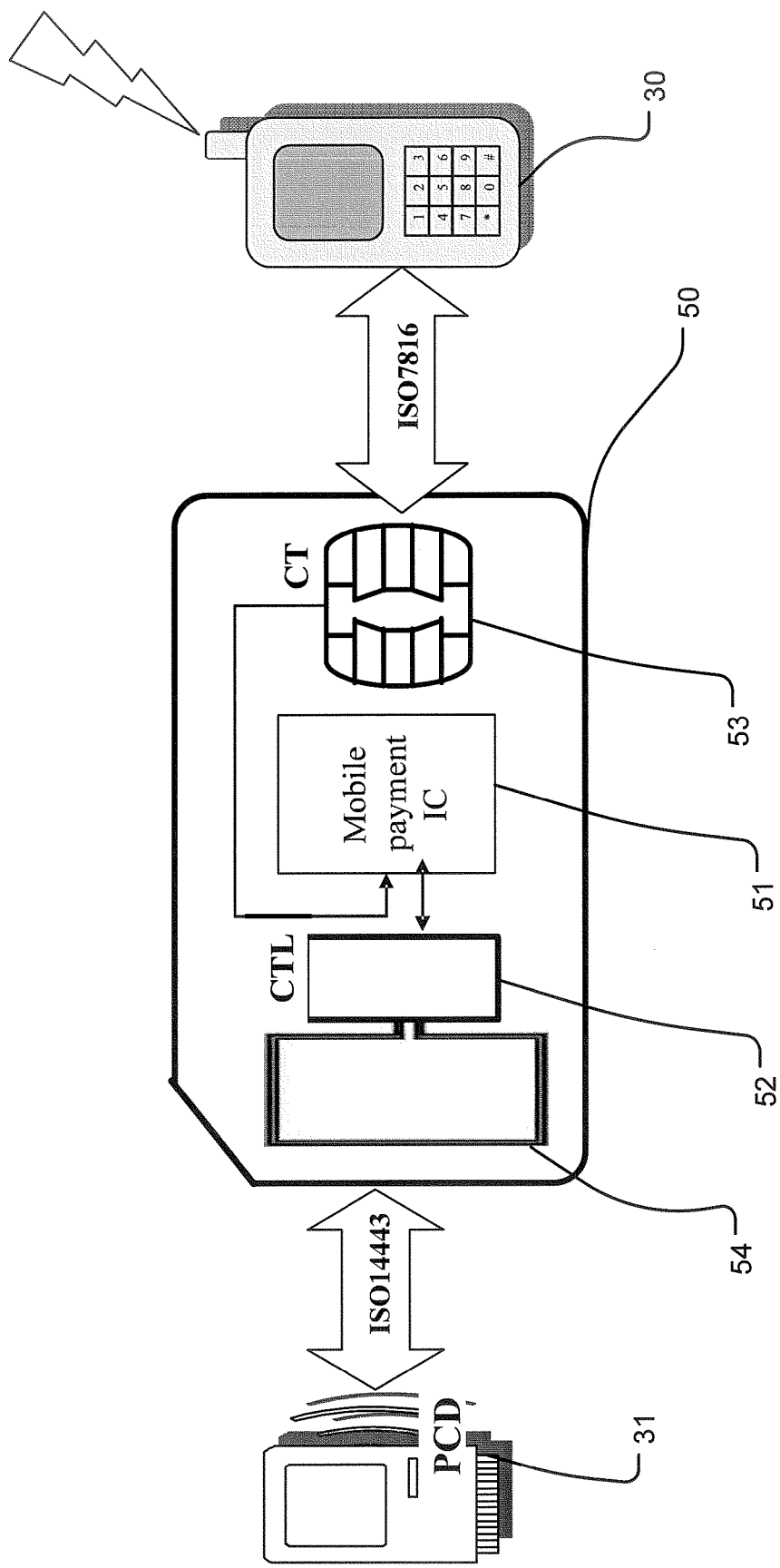
FIG. 4 illustrates an embodiment of a secure storage memory and controller for a mobile communication device as described herein.

FIG. 4 illustrates an embodiment of a controller and secure memory suitable for a mobile communication device like a cellular telephone. In the embodiment of FIG. 4, an integrated circuit 51 which includes a processor and secure memory is mounted on a card 50 compatible with the industry standard subscriber identification module SIM card. The card 50 includes contact interface 53 specified according to the standard ISO 7816 in this example, and is designed to fit with a SIM card slot on the phone 30. In addition to the contact interface 53, integrated circuit 51 is coupled to a wireless communication controller 52 coupled to an antenna 54 for a linking with the PCD 31 according to the industry standard ISO 14443. In embodiments of the technology, integrated circuit 51 includes all system components on a single chip, including the wireless communication controller 52. In other embodiments, integrated circuit 51 is replaced with a microcontroller and separate memory chips and other supporting circuitry as necessary to implement a controller and secure memory for the mobile payment system as described herein.

Figure 5:
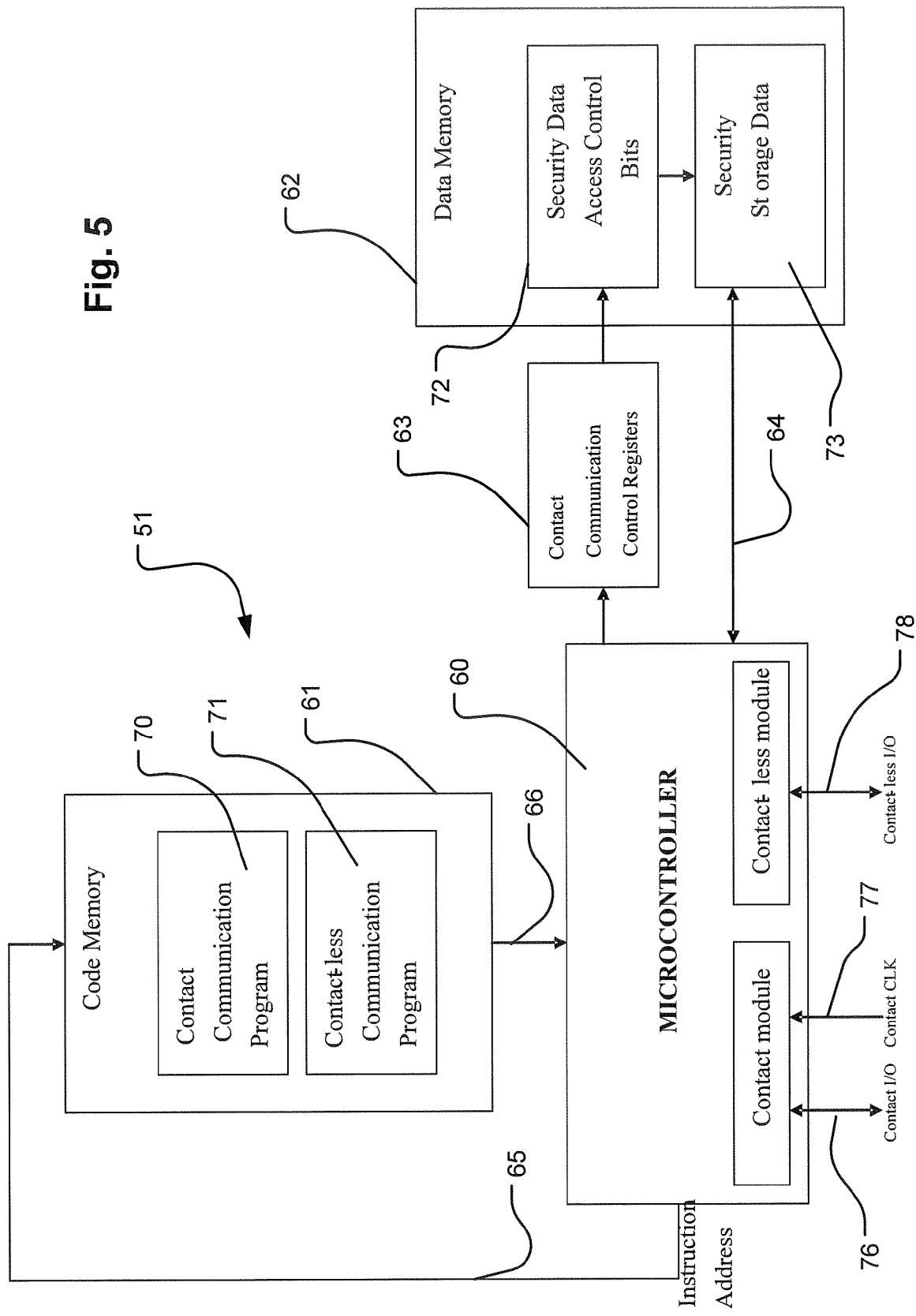
FIG. 5 is a block diagram of the architecture of a secure storage memory and controller system for use in a mobile communication device.

FIG. 5 illustrates a basic block diagram of the integrated circuit 51 suitable for use as a controller and secure memory in a mobile communication device as described herein. The integrated circuit 51 includes a microcontroller 60. The microcontroller 60 is coupled via contact communication control registers 63 to access control bits 72 in the data memory 62. The microcontroller 60 is coupled via instruction bus 66 to a code memory 61. The microcontroller 60 is also coupled via bus 64 for access to secured data in block 73 of the data memory 62. The microcontroller 60 provides address sequencing on bus 65 to the code memory 61. The code memory 61 stores a contact communication program 70 which manages communication through the contacts on the card to the local mobile communication device for management of the stored data. Programs in the code memory have access to the communication protocols that use a channel through the telecommunication provider network via the contact communication program 70. Also, the code memory 61 stores a contactless communication program 71, which manages communication through the contactless module on the card for management of the stored data. Programs in the code memory have access to the communication protocols that communicate with the transaction terminals via the contactless communication program 71. Thus, the microcontroller 60 includes a port 76 for the contact input/output terminals on the card, a port 77 for a clock signal for use with the contact port 76, and a port 78 for driving in the wireless physical layer device.

Figure 6:
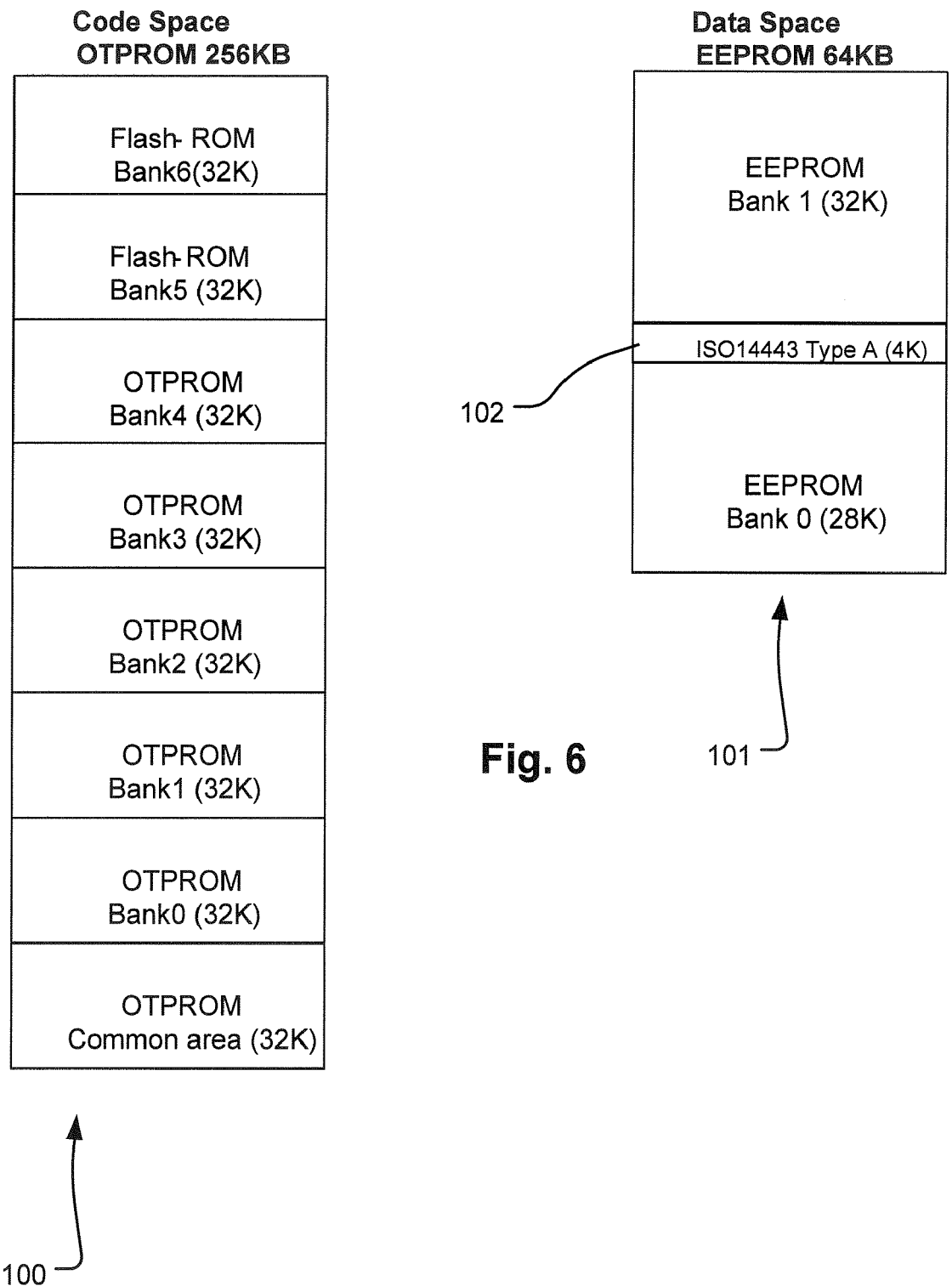
FIG. 6 illustrates a memory organization for secure memory in a system like that of FIG. 5.

FIG. 6 illustrates a memory organization suitable for the integrated circuit 51 mobile payment controller. The memory organization includes a code space 100 storing computer programs, some of which are embedded for example in several banks (Bank0 to Bank4 and a common area) of one-time programmable read-only memory OTPROM that is not alterable by a user, and some of which are alterable in the field using secure program update protocols with the operation server and/or a transaction terminal. The alterable programs are stored in for example flash ROM (Bank5 to Bank6) in an illustrated embodiment. The memory organization also includes a data space 101 comprising for example electrically erasable and programmable read-only memory EEPROM (Bank0 to Bank1), including a segment 102 allocated for the industry standard ISO 14443 Type A secure memory protocol.

Figure 7:
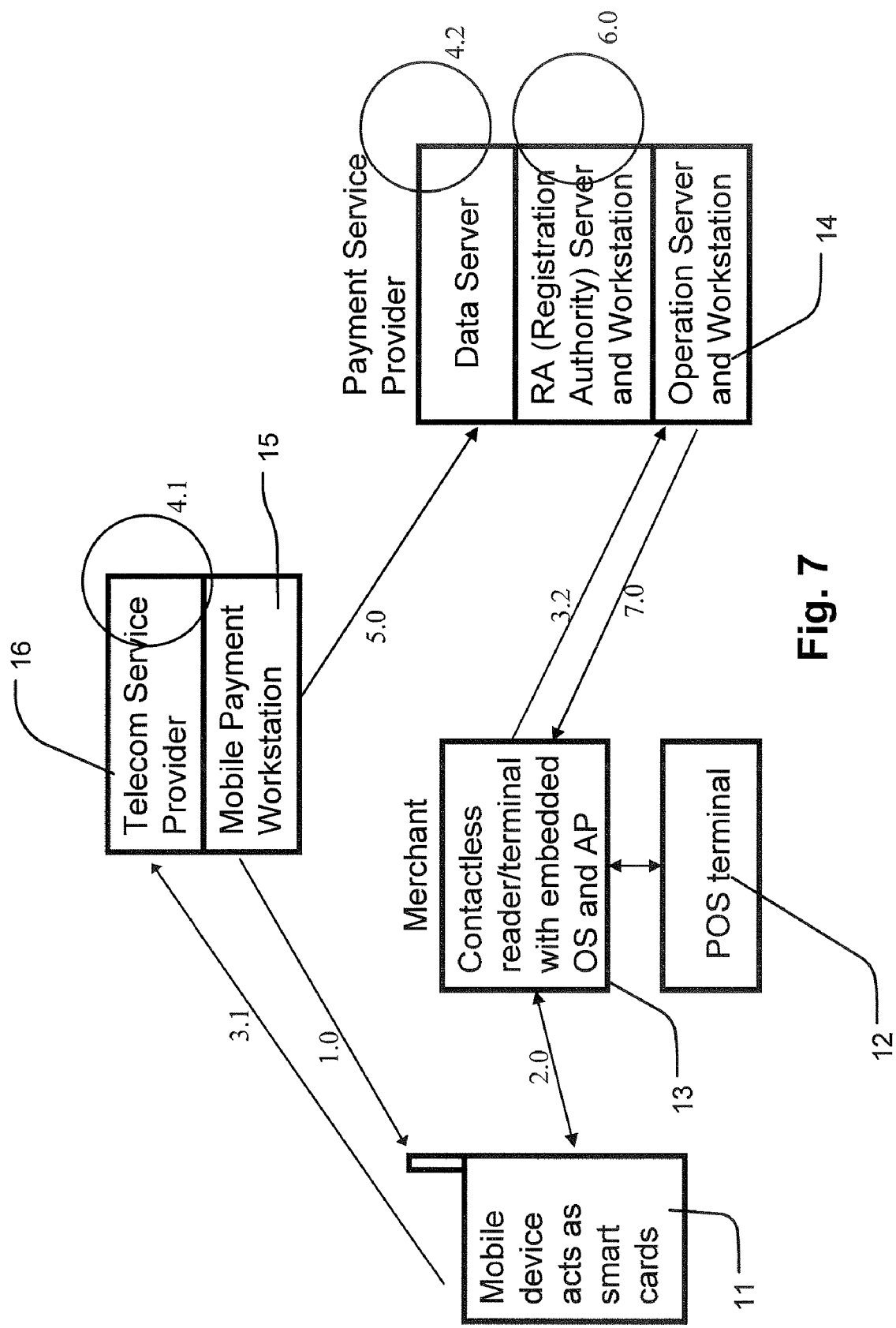
FIG. 7 illustrates control flow for an off-line transaction scenario in a payment service provider network as described herein.

FIG. 7 illustrates a representative control flow for an off-line transaction for purchasing goods or services from a merchant, including the steps 1.0 through 7.0, for a transaction between a mobile communication device 11 and a merchant having a transaction terminal 13 and related system management, according to the architecture shown in FIG. 1. Each step is explained as follows:

1.0—The telecommunication provider network and mobile payment workstation 15 execute a message exchange with the mobile communication device 11 to establish a stored value in the mobile communication device, either by storing a first value, or increasing a stored value.

2.0—In an interchange between the terminal 13 at the merchant's site including a proximity coupling device and the mobile communication device 11, the amount of the stored value is deducted in the mobile communication device and transferred to the transaction terminal in a transaction with a merchant.

3.1—The mobile communication device 11 transmits a transaction record via the telecommunication provider network and mobile payment station 15 using a messaging protocol over the telecom provider network.

3.2—The transaction terminal transmits a transaction record corresponding to the transaction, typically within a batch of transaction records, to the operation server 14.

4.1—The mobile payment station and telecommunication provider network may process the transaction record in a billing system, and bill the customer associated with the mobile communication device 11 for the value established in step 1.0.

4.2—The operation server 14 processes the transaction records passed from the transaction terminal to the operation server in step 3.2.

5.0—The mobile payment workstation transfers the transaction record for the transaction accomplished in step 2.0, typically within a batch of transaction records, to the data server in the operation server and workstation 14.

6.0—The operation server 14 matches the records received in via the telecommunication provider network 16 and mobile payment workstation 15, with the records received from the transaction terminal 13. If the records match, and user authentication and authorization is otherwise properly performed, then the operation server 14 uses the account system to transfer the stored value from the payer's account to the payee's account, settling the transaction.

7.0—The operation server 14 upgrades application programs, maintains current security key exchange for secured data transmissions, credits and debits the stored value at the transaction terminal 13, and downloads promotion data for use by the transaction terminal.

Figure 8:
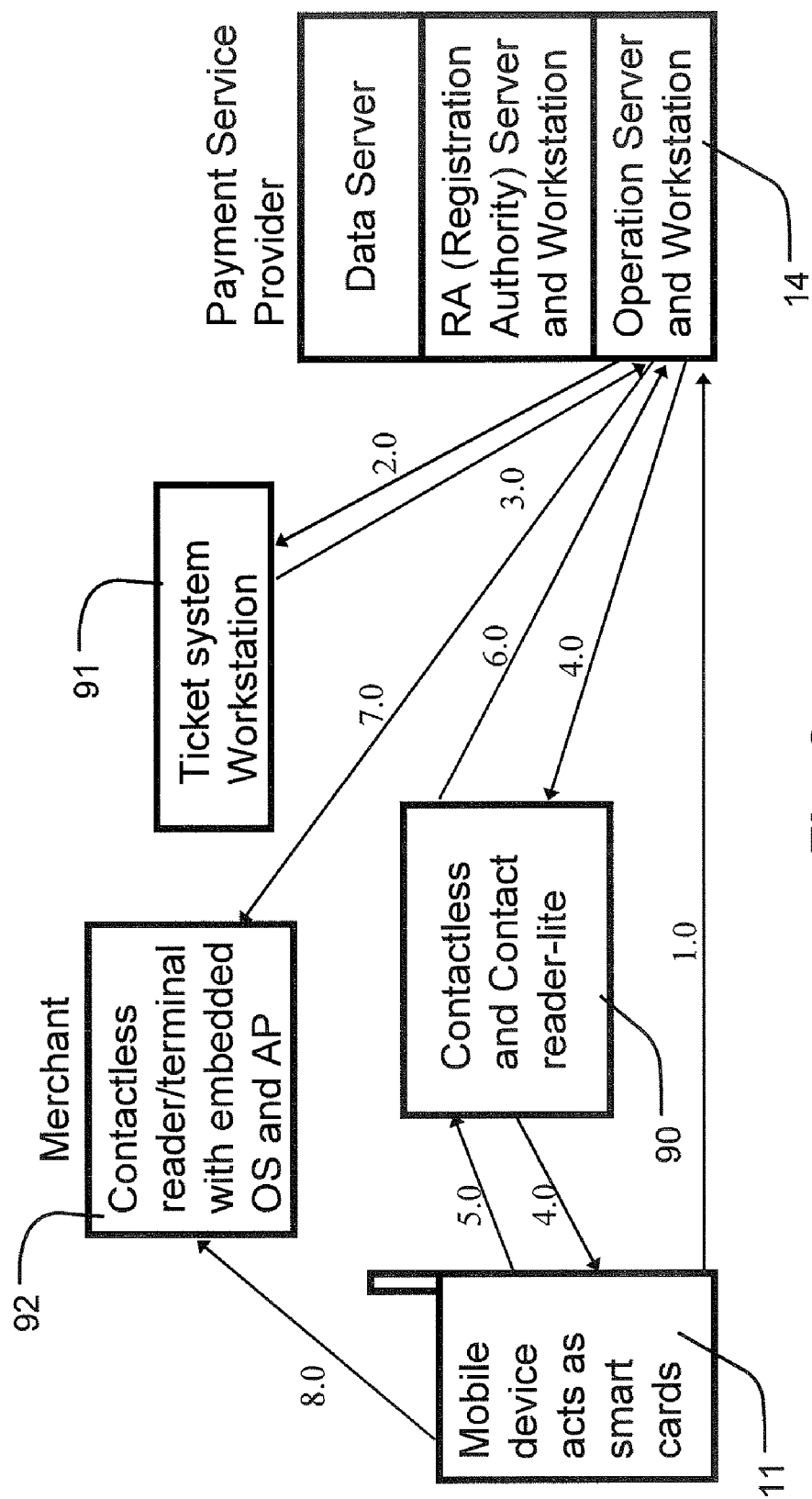
FIG. 8 illustrates control flow for an on-line transaction scenario in a payment service provider network as described herein.

FIG. 8 illustrates support by the payment service provider network described herein for an on-line transaction, by which the user accesses an online system using the mobile communication device for obtaining value from a merchant like a service selling tickets to entertainment events. This scenario includes a mobile payment architecture in which the transaction terminal 13 of FIG. 1 is replaced by a "reader-lite" device 90 adapted for use with a personal computer on a desktop for example, including a proximity coupling device for contactless communication with a mobile communication device, and a wired or contactless link to the personal computer or other host processor. The "reader-lite" device 90 in embodiments of the technology also includes a reader for contact based credit or debit cards, such as a magnetic strip reader or the like. The "reader-lite" device 90 can be adapted for personal use by the holder of the mobile communication device, or for multiuser activities. The operation server 14 is adapted for supporting the "reader-lite" device 90 in the same ways as it supports the transaction terminal in the system of FIG. 1. In addition, the operation server 14 is adapted to communicate with a third party, such as a ticket system workstation 91. The ticket system workstation 91 in this example is a merchant for tickets to entertainment events, although it could operate as an interface for merchants for any type of goods or services. A merchant, such as an entertainment venue, places a contactless reader/terminal 92 like a transaction terminal 13 of FIG. 1 at the venue for redeeming the tickets.

In some embodiments of the system, the operation server 14 is adapted to present a web site configured as a portal for access to merchants such as the ticket system workstation 91. The mobile communication device 11 is further adapted to access the web site presented by the operation server 14, presenting an interactive interface on the mobile communication device 11 for completing transactions with the merchants accessible through the portal. The web site providing the portal may be managed by the operation server 14, or by other web services as known in the art.

A representative control flow for a transaction with the ticket system workstation 91 and related procedures, is shown in FIG. 8. Each step is described as follows:

1.0—The mobile communication device 11 links with the web site presented on behalf of the payment service provider to act as a portal for merchants such as the ticket system workstation 91.

2.0—The web portal redirects the user's link to the merchant system at the ticket system workstation 91, where the resources available through the ticket system workstation 91 allow the user to purchase a ticket to an entertainment event.

3.0—The ticket system workstation 91 returns stored value data representing the purchased ticket, along with transaction records to the operation server 14.

4.0—The operation server 14 transfers the stored value data representing the ticket via the "reader lite" device 90 to the mobile communication device 11, where it is stored for later use.

5.0—In an interactive exchange with the "reader lite" device 90, the stored value on the mobile communication device 11 is deducted according to the transaction to purchase the ticket.

6.0—The "reader lite" device 90 transfers the transaction record to the operation server 14, where the account system in the operation server transfers stored value from the user's account to the ticket system merchant's account.

7.0—The operation server 14 transfers a record of the transaction, typically within a batch of transaction records, to the terminal 92 at the merchant site.

8.0—The user takes the mobile communication device 11 to the transaction terminal 92 at the merchant site, and validates the ticket in the mobile communication device to gain entry into the event, or otherwise redeems the stored value purchased via the portal operated by the operation server 14.

Figure 9:
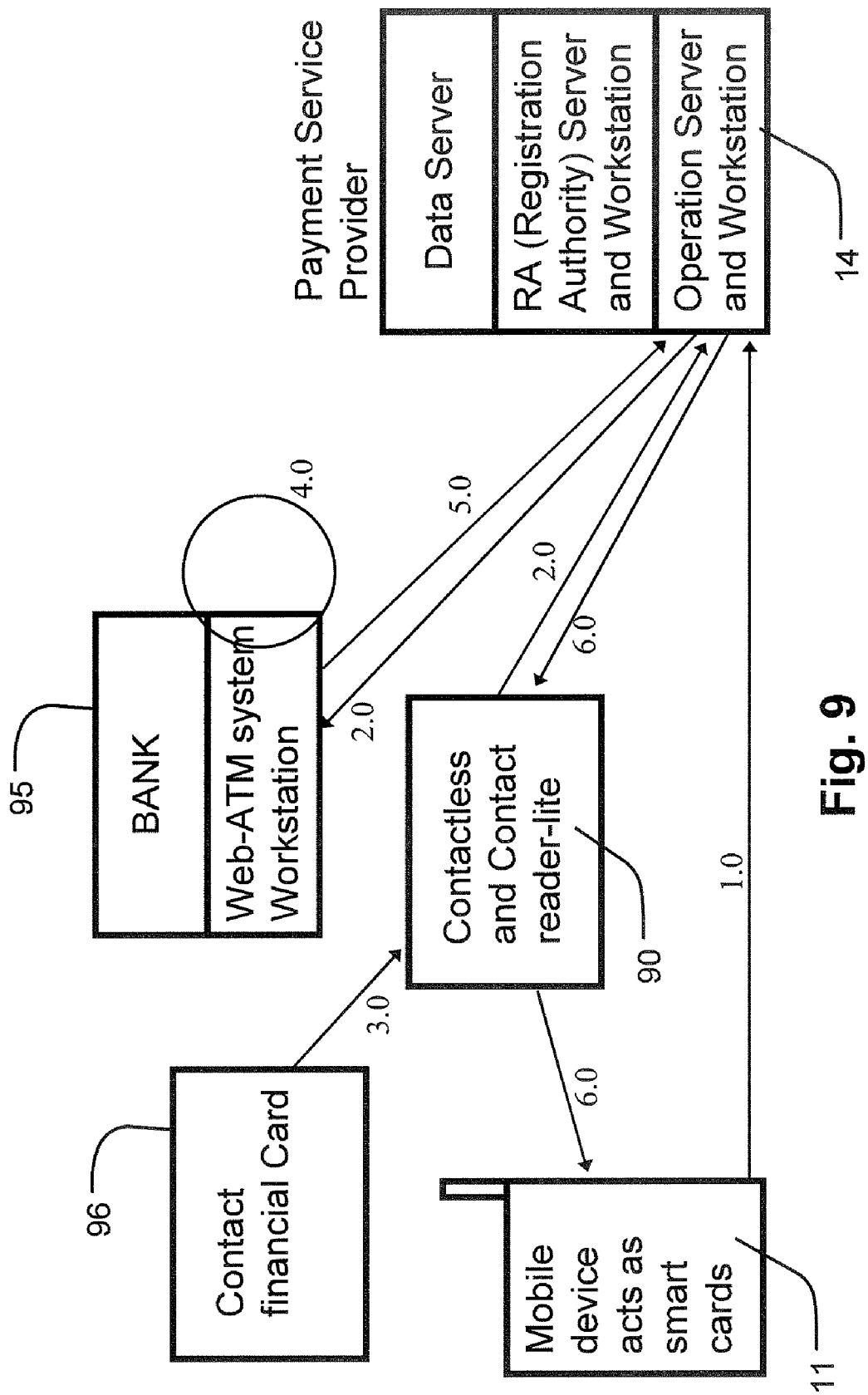
FIG. 9 illustrates control flow for another on-line transaction scenario in a payment service provider network as described herein.

FIG. 9 illustrates support by the payment service provider network described herein for another on-line transaction, by which the user accesses an online system for obtaining value from the web-based, automated teller machine-type online network presented by a bank or other financial institution. In this embodiment, a server which is part of financial transaction network, such as a web based automatic teller machine work station 95 is coupled with the operation server 14. The "reader-lite" device 90 also includes resources for reading a magnetic strip on a financial card 96, such as a credit or debit card issued by a bank. The workstation 95 operates on behalf of the bank that issued the card, or by the bank itself or by an affiliated financial institution.

A representative control flow for a transaction with the automatic teller machine work station 95 and related procedures, is shown in FIG. 9. Each step is described as follows:

1.0—The mobile communication device 11 links with the web site presented on behalf of the payment service provider to act as a portal for financial institutions, such as the ATM system workstation 95.

2.0—The operation server web portal redirects the user's link to a web site operated by the workstation 95 on behalf of the financial institution. The payment service provider which operates the operation server 14 maintains an account with the financial institution to support fund transfer between the accounts held by the users and the payment service provider.

3.0—The user inserts the financial card 96 into the "reader-lite" device 90, which performs the necessary authentication processes.

4.0—Via the web site operated by the workstation 95, the user instructs the financial system to transfer funds from the user's account to the payment service provider account managed by the financial institution associated with the workstation 95.

5.0—The Bank returns a message indicating that the transfer has been completed to the operation server, where the account system increases the user's balance of stored value for the payment service provider network.

6.0—The operation server 14 transfers stored value data deducted from the users account via the "reader lite" device 90 to the mobile communication device 11, where it is stored for later use.

Figure 10:
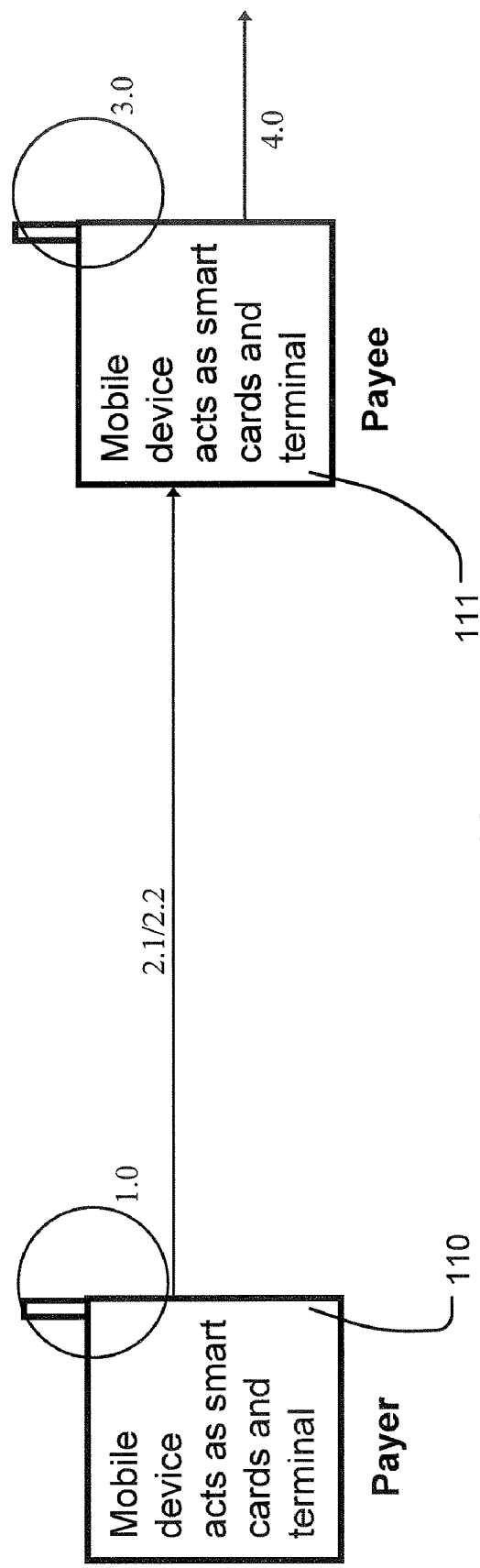
FIG. 10 illustrates control flow for transactions between two mobile communication devices for a payment service provider network as described herein.

FIG. 10 illustrates an aspect of the financial transaction architecture described herein by which stored value may be transferred between mobile communication devices. Thus, a first mobile communication device 110 held by the payer and a second mobile communication device 111 held by the payee establish communication, either through proximity coupling or by another communication channel which they may support directly between the devices, or using the telecommunication provider network. A representative control flow for a transaction between the mobile communication devices 110 and 111 is shown in FIG. 10. Each step is described as follows:

1.0—The mobile communication device 110 communicates with the mobile communication device 111, to establish a link for transfers of stored value in the form of an electronic check or a coupon, or a ticket purchased earlier by the payer, to the payee's mobile communication device 111, using resources such as the industry standard SIM Toolkit.

2.1—The balance of the stored value in the payer's mobile communication device 110 is deducted by the amount to be transferred, and a message is composed having the characteristics of a check including a payer's signature and an amount to be transferred, or having the characteristics of an endorsed coupon or ticket including a payer's signature along with the electronic coupon or ticket to be transferred.

2.2—The payer transfers the electronic check or endorsed coupon to the payee's mobile communication device 111.

3.0—The payee's mobile communication device 111 stores the electronic check or endorsed coupon as a blocked balance in the stored value memory on the device 111. The payee cannot redeem the check or coupon at this stage. Rather, the blocked balance must be authenticated in an exchange with the operations server, such as at an exchange as described below with reference to FIG. 11.

4.0—The payee's mobile communication device 111 can execute similar transactions with other mobile communication devices, moving the electronic check or endorsed coupon from device to device along with the necessary signatures or endorsements to allow for future redemption of the check or coupon.

Figure 11:
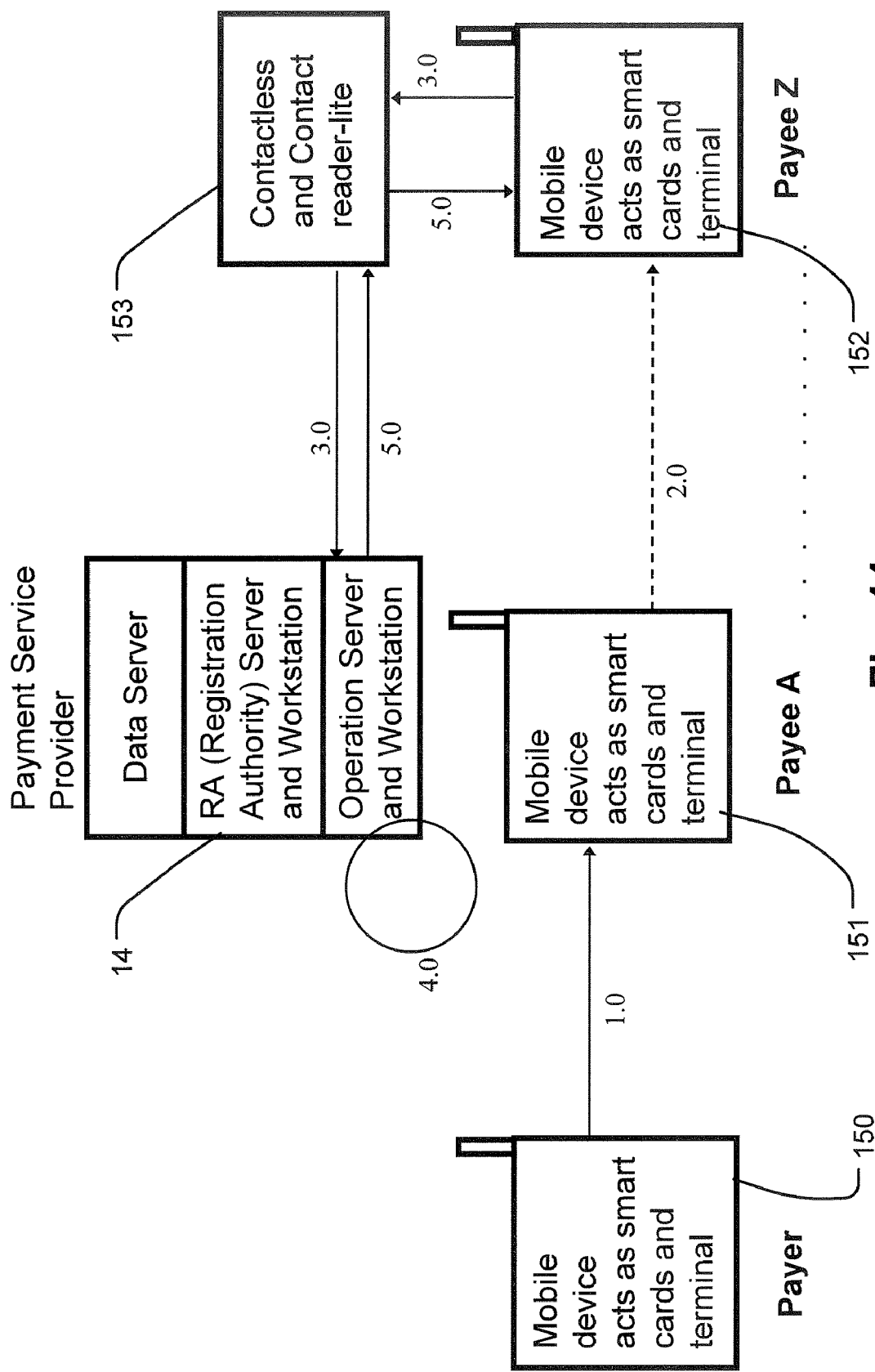
FIG. 11 illustrates control flow for an extension of the mobile communication device to mobile communication device value transfer transactions, and settlement of such transactions using a payment server provided network as described herein.

FIG. 11 illustrates an extension of the financial transaction architecture of FIG. 10, illustrating the transfer of value among multiple mobile communication devices, and redeeming the transferred value using a payment service provider network in an off-line mode, as described herein. In the architecture of FIG. 11, the first mobile communication device 150 acts as an initial payer. A second mobile communication device 151 is referred to as payee A. Subsequent mobile communication devices are connected in a daisy chain communication sequence to a final mobile communication device 152 referred to as payee Z. Each of the mobile communication devices 150-152 includes on-board resources to act as stored value devices and as transaction terminals using proximity coupling devices or other communication technologies for transferring value from device to device. A "reader-lite" device 153, or other transaction terminal which has a communication link with the operation server 14 is included in the architecture shown in FIG. 11. A representative control flow for transactions moving value from device to device, and settling the transactions, is shown in FIG. 11. Each step is described as follows:

1.0—The payer holding mobile communication device 150 transfers stored value to mobile communication device 151 of payee A using a sequence of events such as that described with respect to FIG. 10.

2.0—Payee A holding mobile communication device 151 transfers the value in a check like form to the next mobile communication device, including the signature from the Payer and an endorsement by Payee A, and so on until the stored value reaches the final mobile communication device 152 held by Payee Z.

3.0—Payee Z using mobile communication device 152 couples with the "reader-lite" device 153 using a contactless link, for example, and presents the stored value with the necessary signatures from the payer and endorsements from all of the payees in the sequence, via the operation server 14 through the links available using the "reader-lite" device 153.

4.0—The operation server 14 managing the accounts moves the stored value from the original payer to each payee in the sequence until the stored value finally is credited to the account of the last payee, payee Z.

5.0—The operation server 14 transfers the stored value, or otherwise releases the blocked value, via the "reader-lite" device 153 to the mobile communication device 152 held by payee Z.

Figure 12:
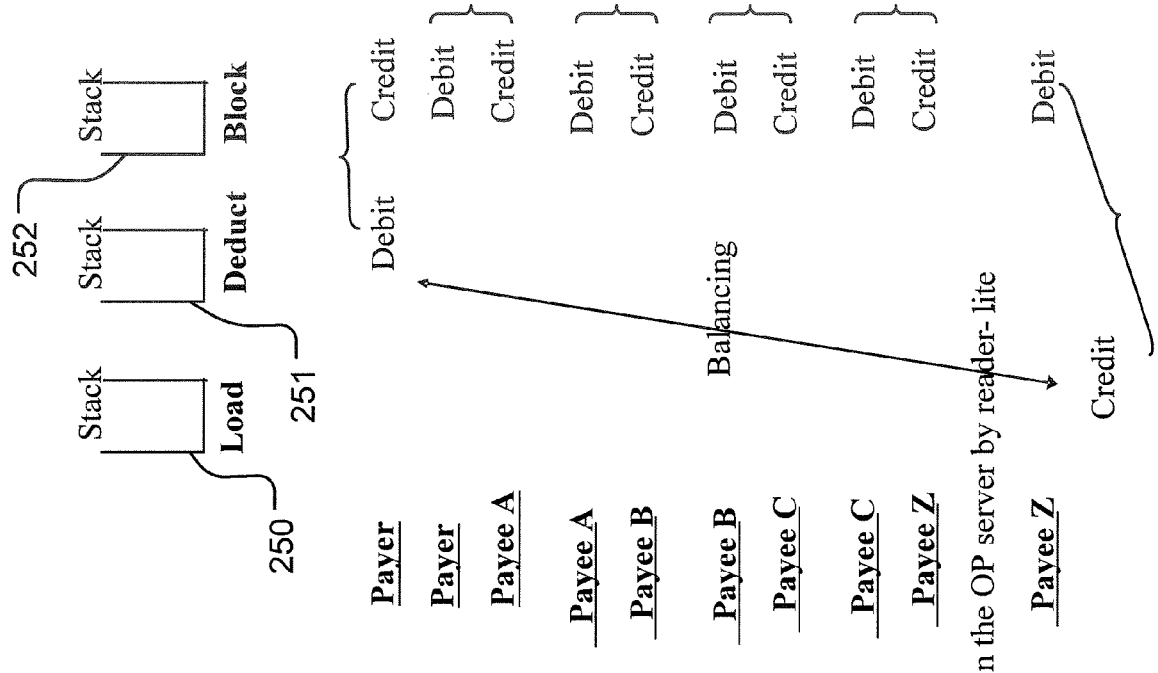
FIG. 12 illustrates a sequence of steps involved in transferring value in a check-like manner through a sequence of mobile communication devices, and a data structure suitable for supporting such transfer.

A representative procedure for transferring value in a check-like manner can be understood with reference to the sequence of steps illustrated in FIG. 12. According to the procedure shown in FIG. 12, each mobile communication device maintains a data structure including three instruction stacks labeled Load stack 250, Deduct stack 251, and Block stack 252 in this example. The Load stack 250 stores instructions used for loading value or increasing the value stored on the device. The Deduct stack 251 stores instructions used for deducting value stored on the device. The Block stack 252 stores instructions for blocking access to value transferred to the device prior to confirmation of the transfer by the operations server or other authorization service. Of course a variety of other data organizations can be utilized. A representative control flow for transactions moving value from device to device, and settling the transactions, is shown in FIG. 11. Each step is described as follows:

1.1—The payer issuing the check-like the transfer executes a debit instruction in Deduct stack 251 and a corresponding credit instruction in Block stack 252.

1.2—Next, the issuing payer transfers an electronic token to Payee A along with loading a debit instruction in its Block stack 252. In response to the transfer, Payee A loads a corresponding credit instruction in its Block stack 252.

2.1—Payee A transfers an electronic token to Payee B and loads a debit instruction in its Block stack 252. In response to the transfer, Payee B loads a corresponding credit instruction in its Block stack 252.

3.1—Payee B transfers an electronic token to Payee C and loads a debit instruction in its Block stack 252. In response to the transfer, Payee C loads a corresponding credit instruction in its Block stack 252.

4.1—Payee C transfers an electronic token to Payee Z and loads a debit instruction in its Block stack 252. In response to the transfer, Payee Z loads a corresponding credit instruction in its Block stack 252.

4.2—Payee Z communicates with the operation server via a "reader-lite" device 153, or other transaction terminal which has a communication link with the operation server 14, using a web portal or otherwise, and presents the check-like electronic token carrying the signatures of each of the mobile communication devices in the sequence, to be "cashed". In response to authentication and authorization from the operation server, the mobile communication device held by Payee Z issues a debit instruction in its Block stack 252 and a corresponding credit instruction in its Load stack 250. The accounting programs in the operation server balance the accounts of the issuing payer and the final payee Z, completing the transaction.

Figure 13:
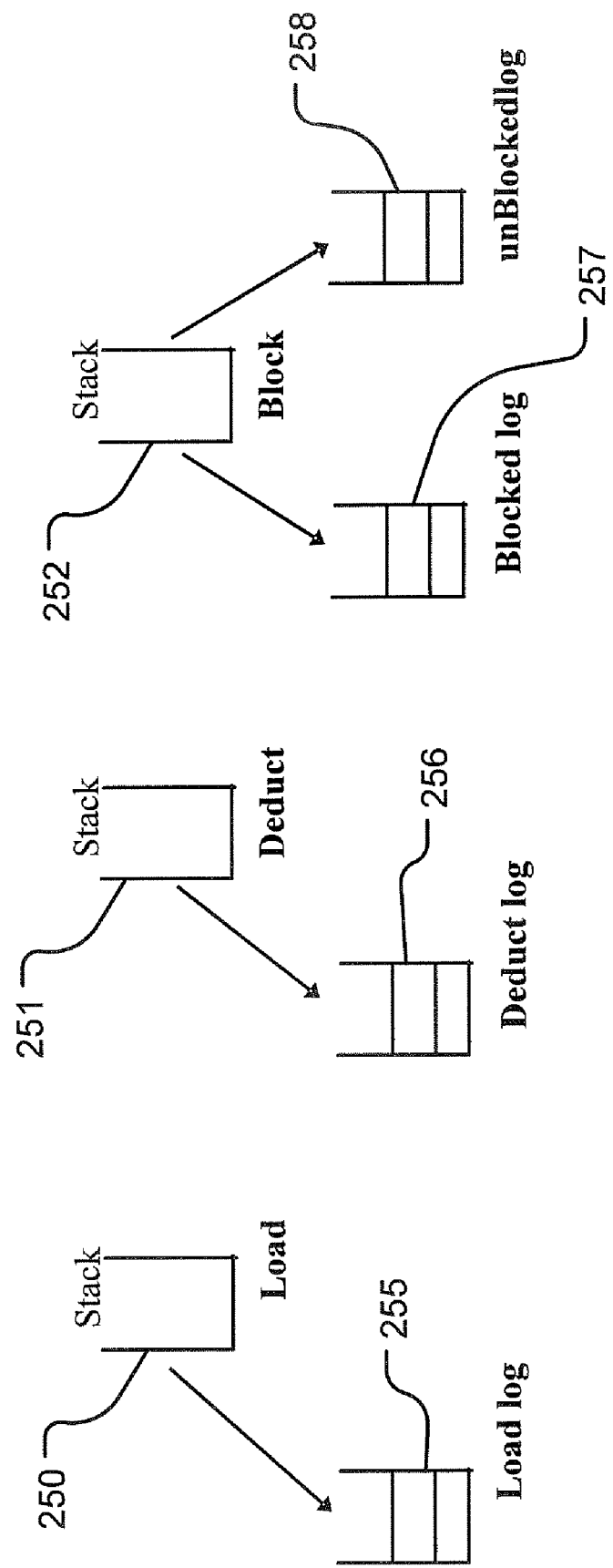
FIG. 13 illustrates data structures maintained in the mobile communication devices to support transferring value, including check-like transfers, coupon redemptions and ticket redemptions.

FIG. 13 illustrates a representative data structure combination maintained on mobile communication devices and secure memory for the purposes of tracking stored value on the device. The data structure for each mobile communication device includes Load stack 250, Deduct stack 251, and Block stack 252 described above with reference to FIG. 12 in which instructions relating to loading value, deducting value and blocking value on the device are maintained. Associated with Load stack 250 is a Load log 255 which maintains a log of executed instructions from Load stack 250 for the purposes of tracking, recordkeeping, fraud detection, and verification of the stored value. Likewise, a Deduct log 256 is maintained in association with Deduct stack 251. The Block stack 252 is associated with a Blocked log 257 and an unBlocked log 258, which respectively maintain records of executed instructions from Block stack 252 which result in blocking value transferred to other parties or otherwise encumber pending action by the operation server or other system.

Figure 14:
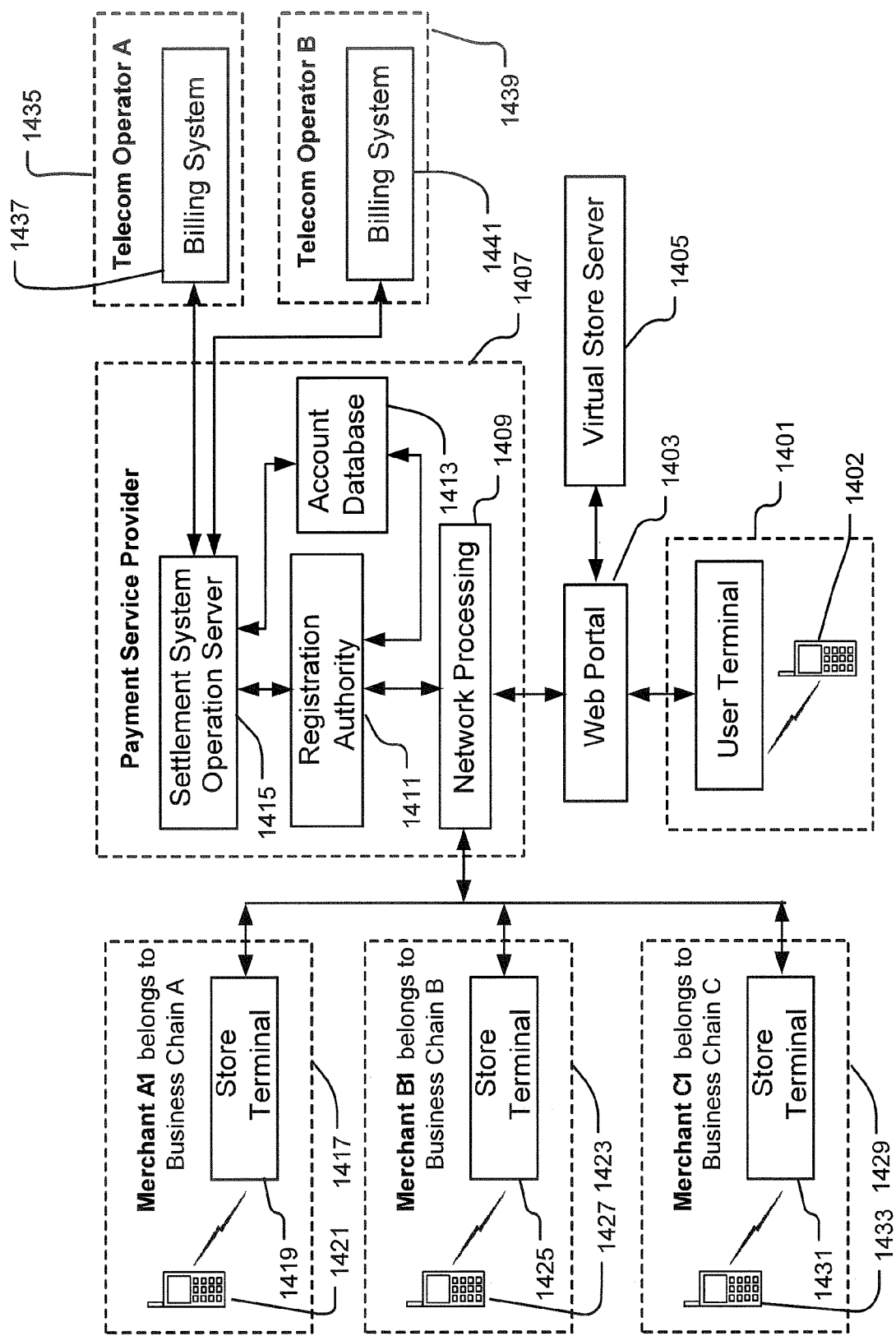
FIG. 14 is a block diagram of another system architecture as described herein.

FIG. 14 is a block diagram of another system architecture as described herein. A user performs transaction with the mobile communications device 1402, which includes on-board resources to act as a stored value device. User terminal 1401 has a web connection with a web portal 1403. Mobile communication device 1402 wirelessly communicates with the web portal 1403 via the user terminal 1401. Alternatively, the user terminal 1401 is combined as part of the mobile communication device 1402, which then communicates with web portal 1403. Via the web portal 1403, the mobile communication device 1402 performs a transaction with the virtual store server 1405. The web portal 1403 facilitates account settlement for transactions with the virtual store server 1405, by communication with the payment service provider 1407.

The mobile communication device also performs transactions with merchants in different business chains or groups, each of which issues electronic currency within each business chain. Payment service provider 1407 also issues electronic currency for common use with multiple business chains by the various mobile communication devices. Business chain A has at least merchant A1 1417. Business chain B has at least merchant B1 1423. Business chain C has at least merchant C1 1429. Mobile communication device 1421 wirelessly initiates a transaction with merchant A1 1417 via store terminal 1419. Mobile communication device 1427 wirelessly initiates a transaction with merchant B1 1423 via store terminal 1425. Mobile communication device 1433 wirelessly initiates a transaction with merchant C1 1429 via store terminal 1431. Account settlement for these transactions with the physical business chains is also performed by communication with the payment service provider 1407. Within payment service provider 1407, network processing 1409 processes communication between the registration authority 1411 of the payment service provider 1407, and the web portal 1403 and the store terminals of merchants in the business chains. Within payment service provider 1407, account settlement is performed by communication among registration authority 1411, account database 1413, and settlement system operation server 1415. Also, accounts are synchronized between the account database 1413 of payment service provider 1407, and the stored value devices of the mobile communication devices. Each user of a mobile communication device periodically receives a summary of transaction records, such as from telecom operator A 1435 and telecom operator B 1439. Telecom operator A 1435 has a billing system 1437 and telecom operator B 1439 has a billing system 1441 which communicate with settlement system operation server 1415, to facilitate such billing of each user of a mobile communication device by each telecom service provider (or Internet service provider) along with the periodic phone bill or Internet service bill. Each user of a mobile communication device has an account number associated with the phone number of the mobile communication device or the physical address associated with the user of the mobile communication device.

Figure 15:
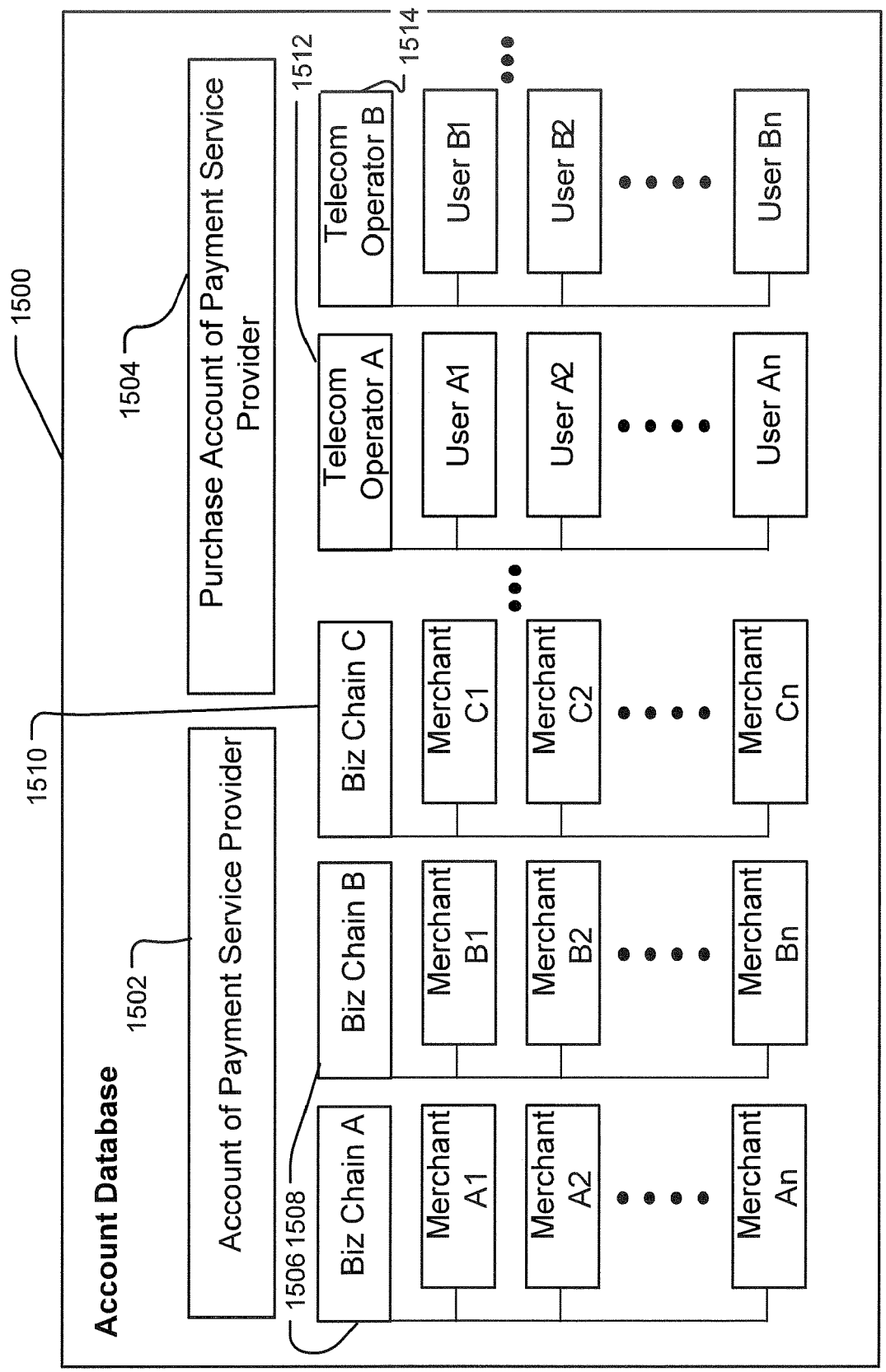
FIG. 15 illustrates a data structure of an account database maintained by a payment service provider to support transferring value, including check-like transfers, coupon redemptions and ticket redemptions.

FIG. 15 illustrates a data structure of an account database maintained by a payment service provider to support transferring value, including check-like transfers, coupon redemptions and ticket redemptions. The account database 1500 is an instance of account database 1413 in FIG. 14. The account database 1500 supports multiple accounts, such as the account of payment service provider 1502 and purchase account of payment service provider 1504. To support the distinct electronic currencies issued by the multiple business chains, the account database 1500 groups merchant accounts together by business chain. For example, account group business chain A 1506 groups together the accounts of Merchants A1, A2, . . . and An. Account group business chain B 1508 groups together the accounts of Merchants B1, B2, . . . , and Bn. Account group business chain C 1510 groups together the accounts of Merchants C1, C2, . . . , and Cn. To support billing of users of mobile communication devices, the account database 1500 groups users together by telecom operator or internet service provider. For example, account telecom operator A 1512 groups together the accounts of Users A1, A2, . . . , and An. Account telecom operator B 1514 groups together the accounts of Users B1, B2, . . . and Bn. Accordingly, each group of accounts represents a separate data type in the accounting data structure.

Figure 16:
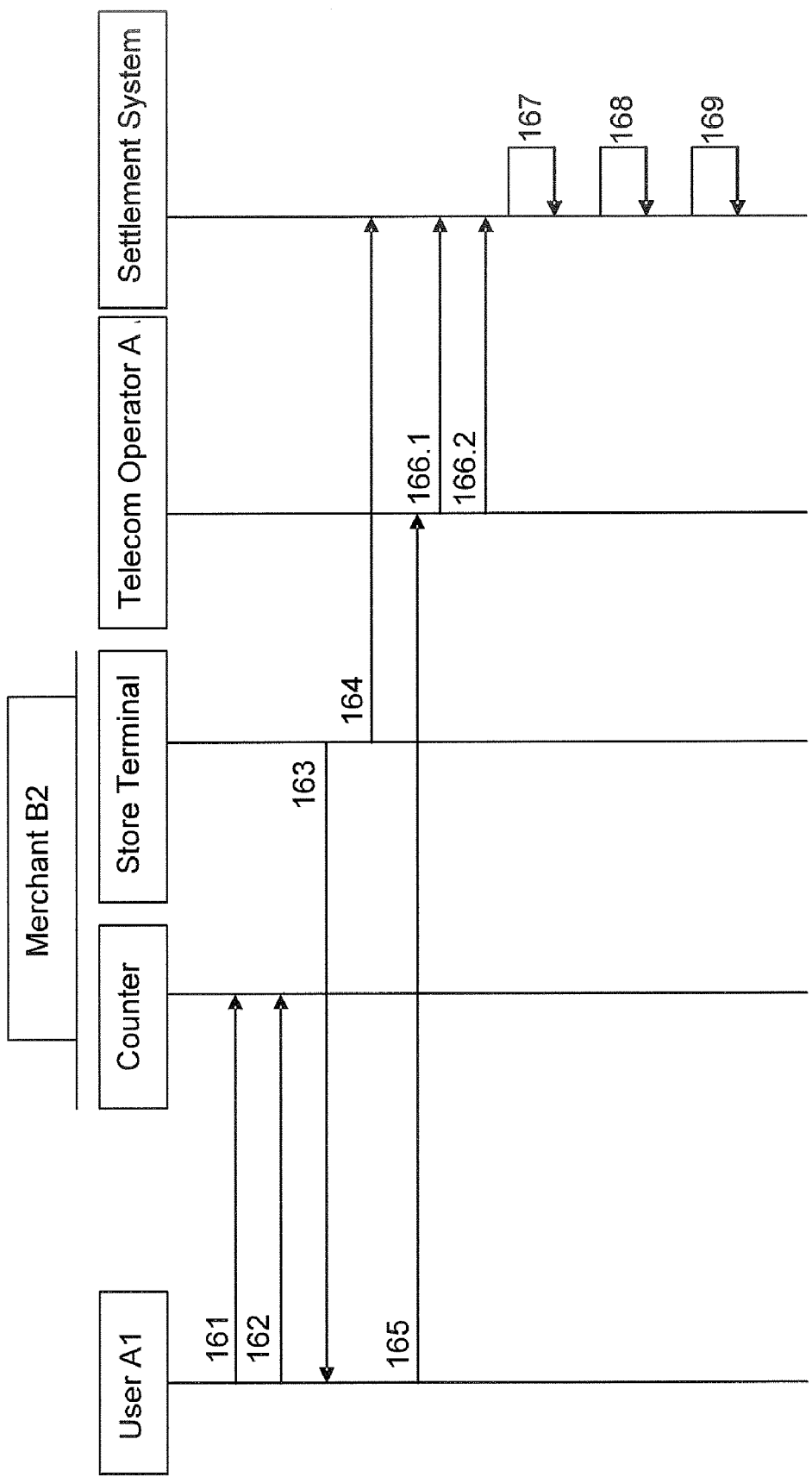
FIG. 16 illustrates control flow in a payment service provider network, for a transaction to add value to a mobile communications device at a store terminal of a merchant.

FIG. 16 illustrates control flow in a payment service provider network, for a transaction to add value to a mobile communications device at a store terminal of a merchant, among mobile communicate device user A1, merchant B2, telecom operator A, and the payment service provider settlement system. The merchant B2 includes a counter and a store terminal. Each step is explained as follows:

161—The mobile communication device user A1 requests merchant B2 to add value 300 points.

162—The mobile communication device user A1 pays money to merchant B2.

163—300 points (e-money issued by biz chain B of merchant B2) are added to the mobile device of mobile communication device user A1.

164—The store terminal of merchant B2 sends the transaction record to the payment service provider settlement system.

165—The transaction record is sent from mobile communication device user A1 to telecom operator A, e.g., by short message service 166.1—The transaction record is passed from telecom operator A to the payment service provider settlement system.

166.2—A blacklist of poor credit risks, such as mobile communication device user accounts that are associated or suspected of fraud, is updated from telecom operator A to the payment service provider settlement system.

167—Verification is performed payment service provider settlement system, checking whether the transaction record from the server of telecom operator A matches the transaction record from merchant B2. If yes, the subsequent procedures follow. If no, then the "purse" of stored value in the mobile device is locked, and the mobile communication device user A1 contacted for data correction and unlocking of the mobile device in case fraud was not involved.

168—The payment service provider settlement system generates a record along with a unique serial number for the 300 points.

169—The payment service provider settlement system logs the unique serial number of the 300 points of e-money and proceeds with the bookkeeping and accounting processes, such as those of FIGS. 17-20.

In another embodiment, a user can add value to a mobile communication device via a telecom network or wireless LAN connected to the Internet.

Figure 17:
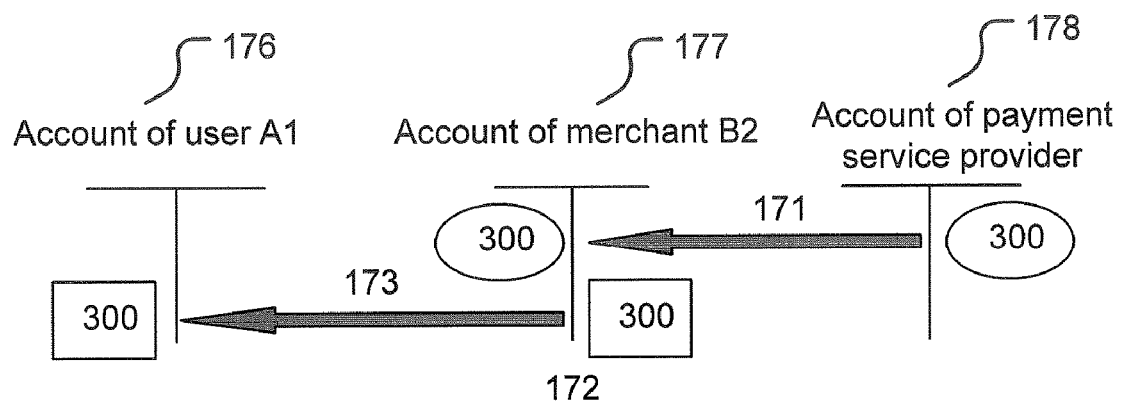
FIG. 17 illustrates a money flow among condensed accounts of credits and debits associated with the transaction of FIG. 16.

FIG. 17 illustrates a money flow among condensed accounts of credits and debits associated with the transaction of FIG. 16, among the account of mobile communication device user A1 176, the account of merchant B2 177, and the account of payment service provider 178. Each step is explained as follows:

171—The payment service provider settlement system debits the account of payment service provider 300 points of e-money, and credits the same value to the account of merchant B2.

172—The payment service provider settlement system purchases the equivalent value of e-money issued by biz chain B from biz chain B. In this example, a ratio of 1:1 is used, as show by the same 300 point value on credit and debit sides.

173—The payment service provider settlement system debits the account of merchant B2 300 points of e-money of biz Chain B, and credits the same value to the account of mobile communication device user A1

Figure 18:
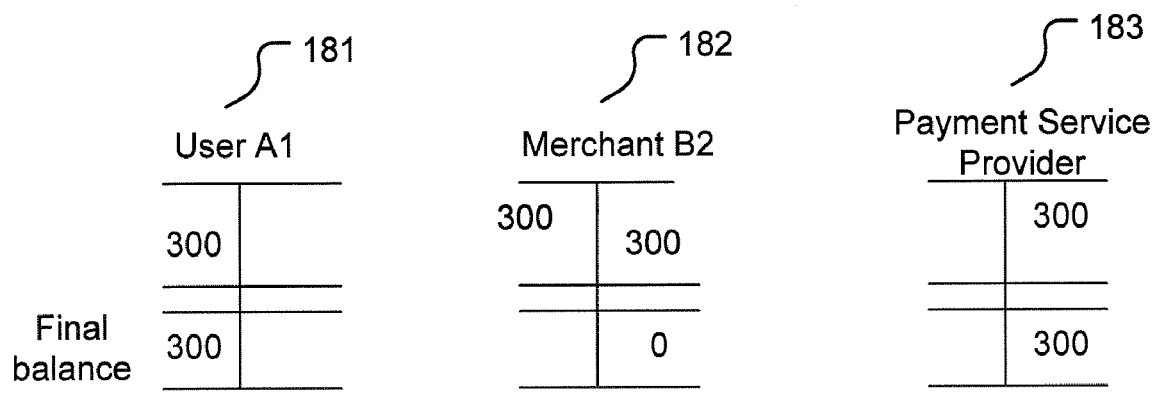
FIG. 18 illustrates condensed accounts of credits and debits associated with the money flow of FIG. 17.

FIG. 18 illustrates condensed accounts of credits and debits associated with the money flow of FIG. 17. The account of mobile communication device user A1 181 has only a 300 point credit and has a final credit balance of 300 points. The account of merchant B2 182 has both a 300 point credit and a 300 point debit, and has a final balance of 0 points. The account of the payment service provider 183 has only a 300 point debit and has a final debit balance of 300 points.

Although not shown, in one example, ultimately the payment service provider is reimbursed by mobile communication device user A1, such as via the billing system of a telecom service provider or internet service provider.

Figure 19:
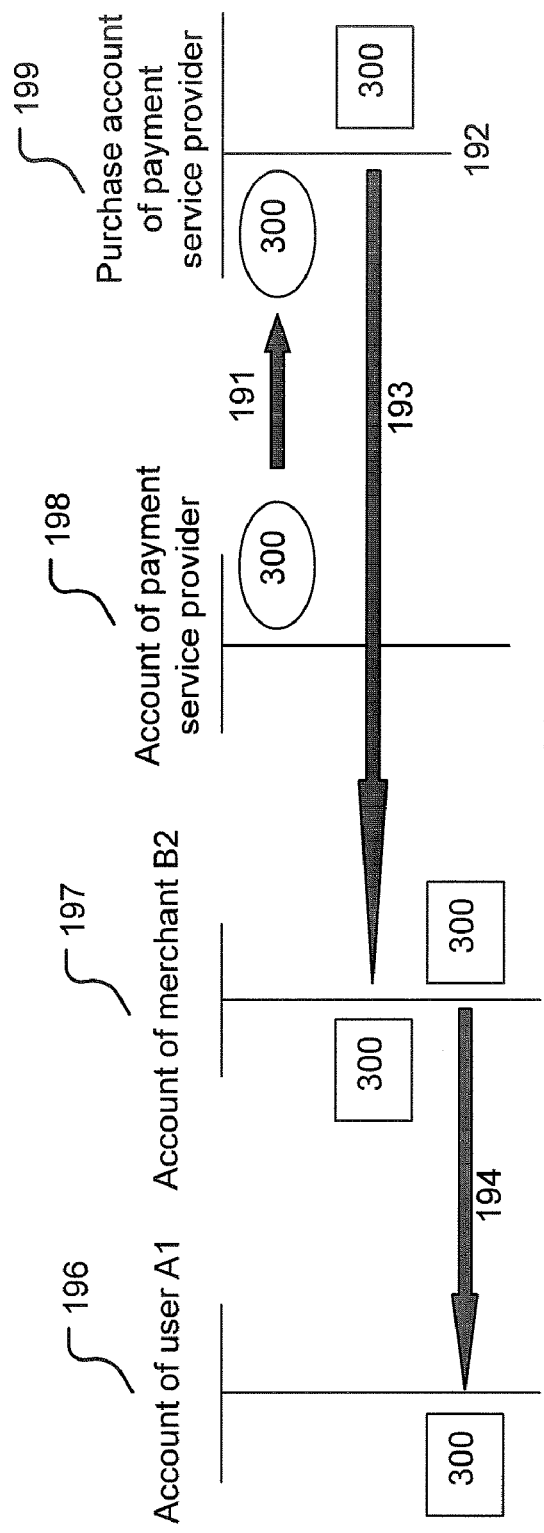
FIG. 19 illustrates an alternative money flow among condensed accounts of credits and debits associated with the transaction of FIG. 16.

FIG. 19 illustrates an alternative money flow among condensed accounts of credits and debits associated with the transaction of FIG. 16, among the account of mobile communication device user A1 196, the account of merchant B2 197, the account of payment service provider 198, and the purchase account of payment service provider 199. Each step is explained as follows:

191—The payment service provider settlement system debits the payment service provider 300 points of e-money, and credits the same value to the purchase account of the payment service provider.

192—The payment service provider settlement system triggers a process to purchase the equivalent value of e-money issued by biz Chain B. In this example, a ratio of 1:1 is used, as shown by the same 300 point figure on credit and debit sides.

193—The payment service provider settlement system debits the purchase account of the payment service provider 300 points of the e-money issued by biz chain B, and credits the same value to merchant B2.

194—The payment service provider settlement system debits merchant B2 300 points of e-money of biz chain B, and credits the same value to mobile communication device user A1.

Figure 20:
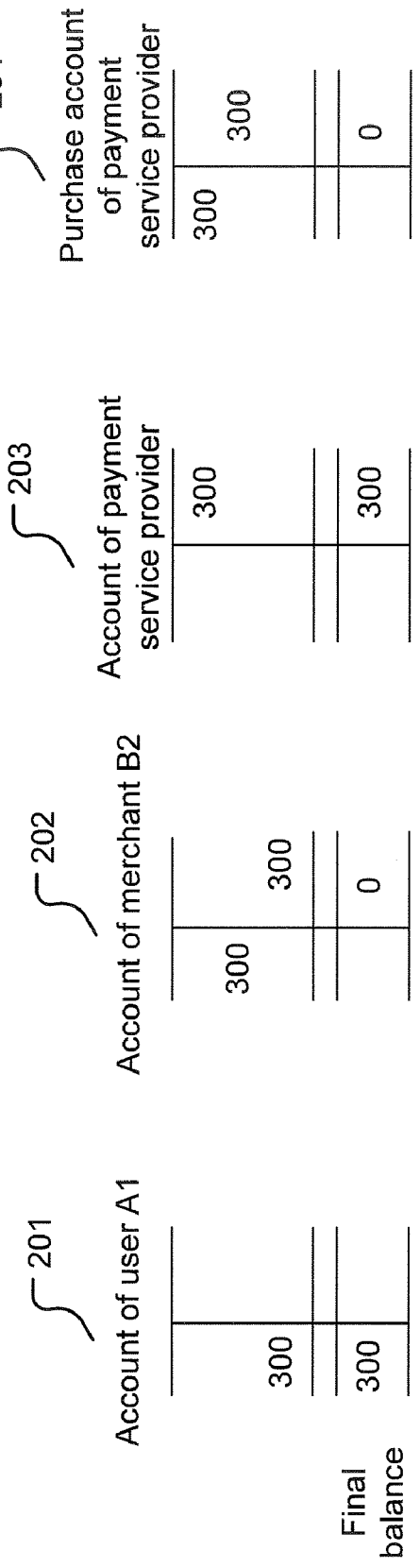
FIG. 20 illustrates condensed accounts of credits and debits associated with the money flow of FIG. 19.

FIG. 20 illustrates condensed accounts of credits and debits associated with the money flow of FIG. 19. The account of mobile communication device user A1 201 has only a 300 point credit and has a final credit balance of 300 points. The account of merchant B2 202 has both a 300 point credit and a 300 point debit, and has a final balance of 0 points. The account of the payment service provider 203 has only a 300 point debit and has a final debit balance of 300 points. The purchase account of payment service provider 204 has both a 300 point credit and a 300 point debit, and has a final balance of 0 points. Although not shown, in one example, ultimately the payment service provider is reimbursed by mobile communication device user A1, such as via the billing system of a telecom service provider or internet service provider.

Figure 21:
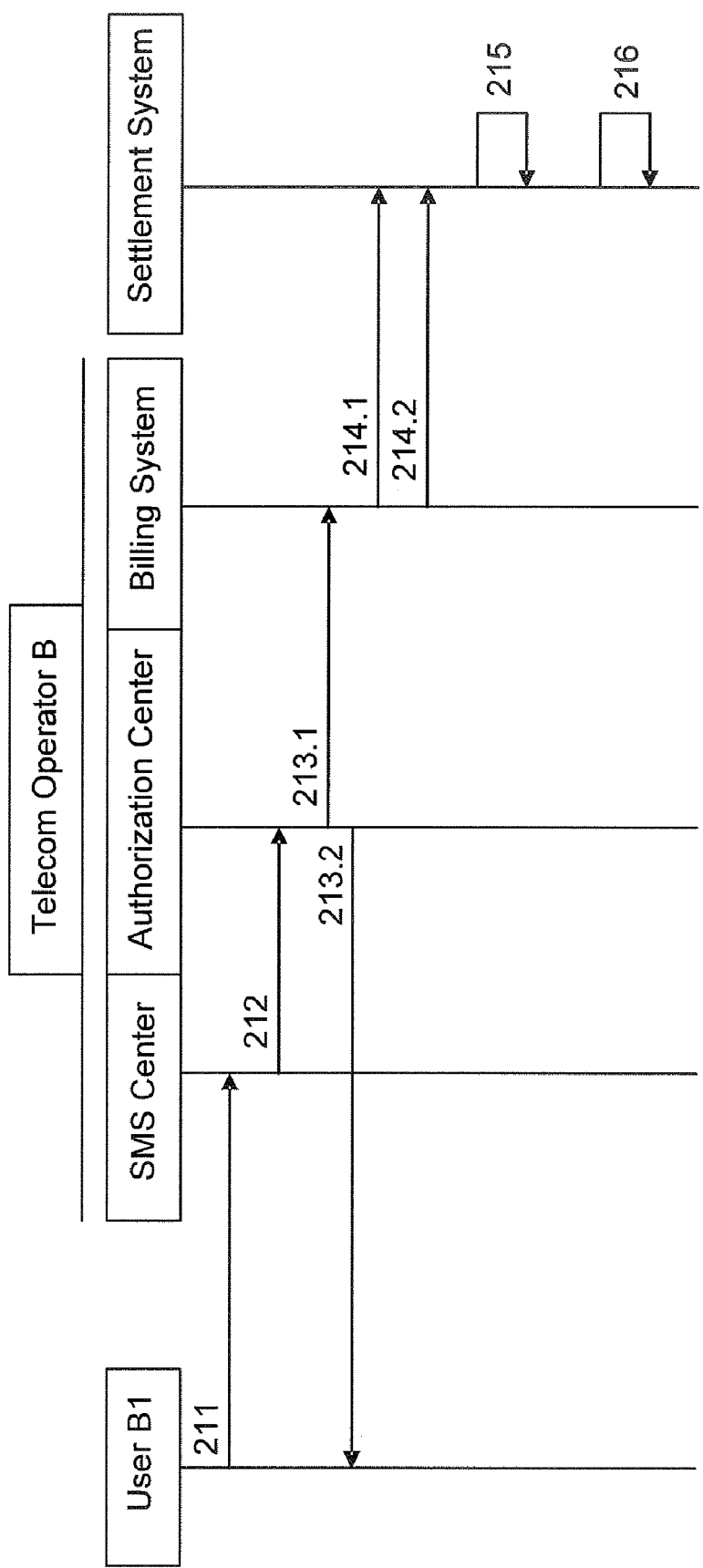
FIG. 21 illustrates control flow in a payment service provider network, for a transaction to add value to a mobile communications device via a telecommunication service provider network.

FIG. 21 illustrates control flow in a payment service provider network, for a transaction to add value to a mobile communications device via a telecommunication service provider network, among mobile communicate device user B1, telecom operator B, and the payment service provider settlement system. The telecom operator B includes a SMS center, an authorization center, and a billing system. Each step is explained as follows:

211—The mobile communicate device user B1 requests telecom operator B to add 500 points of value by SMS.

212—The SMS center of telecom operator B requests authorization to add the 500 points from the authorization center of telecom operator B.

213.1—If the request is determined as valid by the authorization center of telecom operator B, the transaction is passed to the billing system of telecom operator B.

213.2—If the request is determined as valid by the authorization center of telecom operator B, then the SMS Center of telecom operator B replies by SMS to the mobile communicate device user B1 to add 500 points to the mobile device of mobile communicate device user B1.

214.1—The billing system of telecom operator B passes the transaction record to the payment service provider settlement system.

214.2—A blacklist of poor credit risks, such as mobile communication device user accounts that are associated or suspected of fraud, is updated from the billing system of telecom operator B to the payment service provider settlement system.

215—The payment service provider settlement system generates a record along with a unique serial number for the 500 points of e-money issued by the payment service provider.

216—The payment service provider settlement system logs the serial number of the e-money and proceeds with the subsequent bookkeeping and accounting process, so that the payment service provider directly credits 500 points to user B1.

Figure 22:
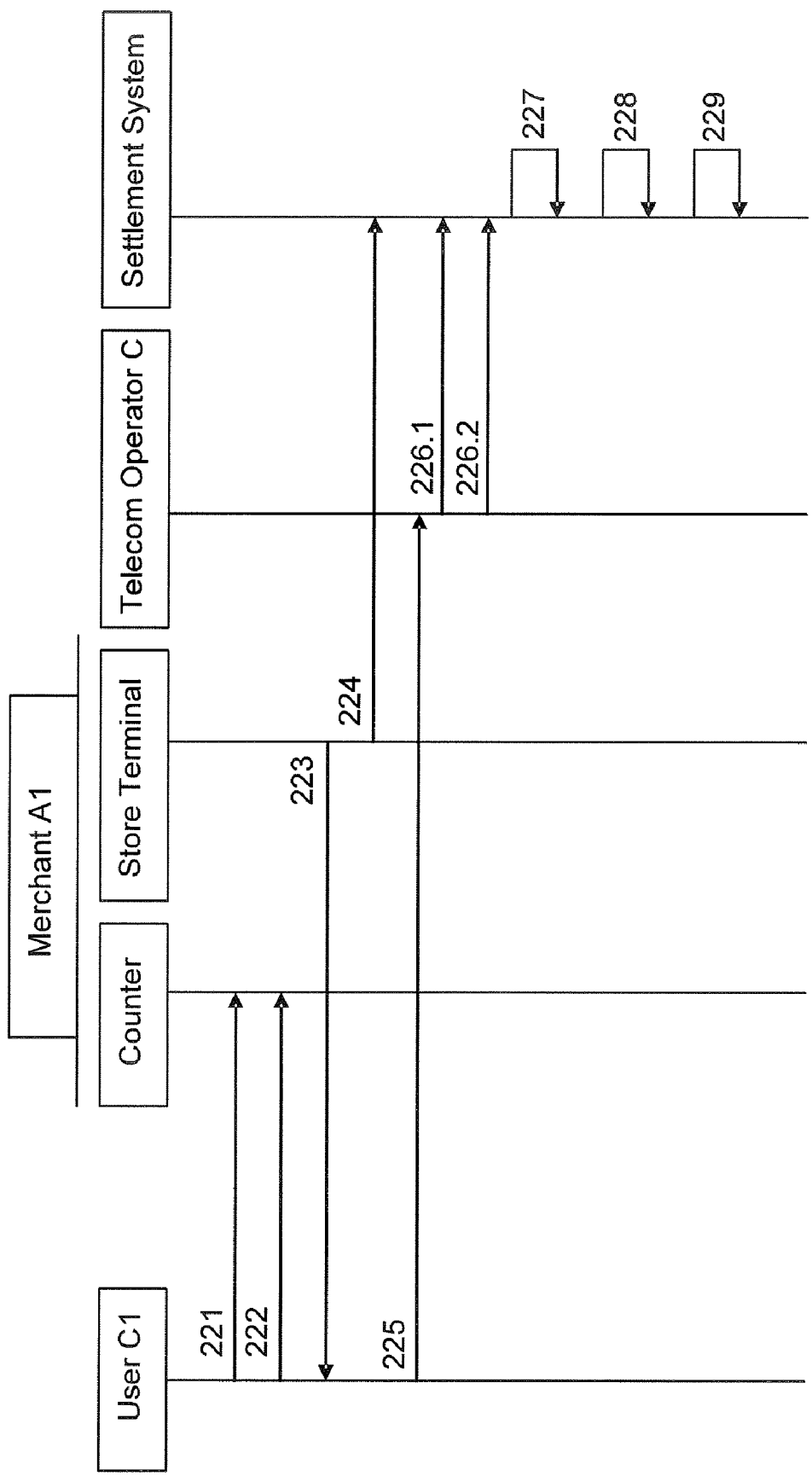
FIG. 22 illustrates control flow in a payment service provider network, for a transaction to use a mobile communications device to pay money at a store terminal of a merchant.

FIG. 22 illustrates control flow in a payment service provider network, for a transaction to use a mobile communications device to pay money at a store terminal of a merchant, among mobile communicate device user C1, merchant A1, telecom operator C, and the payment service provider settlement system. The merchant A1 includes a counter and a store terminal. Each step is explained as follows:

221—The mobile communicate device user C1 checks the balance in the e-purse of the mobile device, which turns out to still have 1000 points of stored value.

222—The mobile communicate device user C1 uses the mobile device to pay 200 points for purchases with merchant A1.

223—200 points of e-money issued by the payment service provider is deducted from the e-purse of the mobile device by the store terminal of merchant A1.

224—The store terminal of merchant A1 sends the transaction record to the payment service provider settlement system.

225—The transaction record is sent to the telecom operator C from the mobile communicate device of mobile communicate device user C1 by short message service.

226.1—The billing system of telecom operator C passes the transaction record to the payment service provider settlement system.

226.2—A blacklist of poor credit risks, such as mobile communication device user accounts that are associated or suspected of fraud, is updated from the billing system of telecom operator C to the payment service provider settlement system.

227—If the request is verified by the payment service provider settlement system by matching the transaction record from the server of the telecom operator C with the transaction record from merchant A1. If yes, the subsequent procedures follow. If no, then the "purse" of stored value in the mobile device is locked, and the mobile communication device user C1 contacted for data correction and unlocking of the mobile device in case fraud was not involved.

228—The payment service provider settlement system generates a record along with a unique serial number for the 200 points of e-money.

229—The payment service provider settlement system logs the serial number of the e-money and proceeds with the subsequent bookkeeping and accounting process, such as that shown in FIGS. 23-26.

FIG. 23 illustrates a money flow among condensed accounts of credits and debits associated with the transaction of FIG. 22, among the account of mobile communication device user C1 236, the account of merchant A1 237, the account of payment service provider 238, and the purchase account of payment service provider 239. Each step is explained as follows:

231—The payment service provider settlement system debits the account of mobile communication device user C1, assuming C1 has 1000 points of stored value on the mobile communication device, by 200 points issued by the payment service provider, and the account of credits merchant A1 by the same value.

232—The payment service provider settlement system debits the account of merchant A1 by 200 points of the e-money issued by payment service provider, and credits the account of the payment service provider by the same value.

233—The payment service provider settlement system triggers a process to purchase the equivalent value of e-money issued by biz chain A. In this example, a ratio of 1:1 is used, as shown by the same 300 point figure on the credit side of the account of payment service provider 238 and the debit side of the purchase account of payment service provider 239.

234—The payment service provider settlement system debits the 200 points of e-money of Biz Chain A from the purchase account of payment service provider, and credits the account of merchant A1 by the same value.

235—The payment service provider settlement system pays the 200 points of e-money of biz chain A in the account of merchant A1, back to the purchase account of payment service provider, to complete the transaction.

FIG. 24 illustrates condensed accounts of credits and debits associated with the money flow of FIG. 23. The account of mobile communication device user C1 241 has a 1000 point credit and a 200 point debit, and has a final credit balance of 800 points. The account of merchant A1 242 has two 200 point credits and two 200 point debits, and has a final balance of 0 points. The account of the payment service provider 243 has both a 200 point credit and a 1000 point debit, and has a final debit balance of 800 points. The purchase account of payment service provider 244 has both a 200 point credit and a 200 point debit, and has a final balance of 0 points. Although not shown, earlier, mobile communication device user C1 had purchased 1000 points of e-money issued by the payment service provider.

FIG. 25 illustrates an alternative money flow among condensed accounts of credits and debits associated with the transaction of FIG. 22, among the account of mobile communication device user C1 2506, the account of merchant A1 2507, the account of payment service provider 2508, and the purchase account of payment service provider 2509. Each step is explained as follows.

2501—The payment service provider settlement system debits the account of mobile communication device user C1, assuming C1 has 1000 points of stored value on the mobile communication device, by 200 points issued by biz chain A, and credits the account of merchant A1 by the same value.

2502—The payment service provider settlement system debits 200 points of the e-money issued by biz chain A from the account of merchant A1, and credits the purchase account of payment service provider.

2503—The payment service provider settlement system triggers a process to purchase the equivalent value of e-money issued by the payment service provider. In this example, a ratio of 1:1 is used, as shown by the same 200 point figure on the credit side of the purchase account of payment service provider 2509 and the debit side of the purchase account of payment service provider 2509.

2504—The payment service provider settlement system pays the 200 points of e-money of the payment service provider back to the account of payment service provider to complete the transaction.

FIG. 26 illustrates condensed accounts of credits and debits associated with the money flow of FIG. 25. The account of mobile communication device user C1 261 has a 1000 point credit and a 200 point debit, and has a final credit balance of 800 points. The account of merchant A1 262 has a 200 point credit and a 200 point debit, and has a final balance of 0 points. The account of the payment service provider 263 has both a 200 point credit and a 1000 point debit, and has a final debit balance of 800 points. The purchase account of payment service provider 264 has both a 200 point credit and a 200 point debit, and has a final balance of 0 points. Although not shown, earlier, mobile communication device user C1 had purchased 1000 points of e-money issued by the payment service provider.

Mobile communication devices as described herein are capable of issuing and redeeming check-like transfers of value by a process involving transferring electronic tokens bearing data sufficient to track the transfers among devices such as device signatures and endorsements, and maintaining data structures supporting the issuing and redeeming steps pending verification by and operation server.

In general, the architecture described herein provides an operation server 14 central to the payment service provider system. The operation server 14 manages an account system handling the assets of the participants, including electronic gift certificates, electronic checks, electronic coupons, electronic tickets and so on, in an account management program having high security policies. The system operates in both an on-line mode and an off-line mode. In the off-line mode, the account system in the operation server 14 simulates the Central Bank structure, such as the structure of the Federal Reserve System and United States, and acts as the final settlement institute for stored values such as electronic gifts, electronic checks, or electronic coupons. Thus, in an off-line scenario, the transaction terminal at a merchant site takes the role of a bank, recording each transaction in a book of accounts, and transfers a batch of transactions to the operation server 14 periodically for daily clearing. The operation server 14 also keeps accounts for holders of each mobile communication device. In this way, system settlement insures the completion of proper movement of value among the accounts, including the accounts of merchants and individuals, and keeps balance in the credit and debit positions on a periodic basis. Periodically, such as daily during the account clearing, the system moves funds among the purchased accounts to settle the specific transactions. The operation server 14 can operate the process that maintains a stored value ledger for example, and balances the ledger for final settlement of all the transactions being processed in a batch.

In on-line transactions, transactions are managed using an on-line protocol that can clear both accounts of the merchants and the individual, trigger account movement, and finish the settlement process. This way, the balance status of the accounts of both the merchant and the individual can be balanced with the stored value on the old device at the time of the transactions.

According to embodiments of the architecture described herein, the operation server uses a second factor to increase the trust of the settlement process. Thus, the architecture used herein supports the use of security factors produced and delivered to the operation server by the transaction terminal, and security factors produced and delivered via the telecommunication provider network to the operation server, to verify individual transactions. In this manner, the operation server architecture represents a system having high security for consistency and integrity of the transactions and of the correctness of the settlement of transactions. In addition, the operation server using the two channels for verification is able to monitor the stored value accounts on the mobile phones for the possibility of tampering.

A robust architecture is presented integrating on-line and off-line transactions unlike the classic prepay, off-line stored value system. The technology described herein includes a central settlement mechanism that supports more flexible scenarios for use in transferring stored value among mobile communication devices, and between carriers of mobile communication devices and merchants. Furthermore, the system is extendable to use both fixed point and mobile communication devices as stored value devices that can interact with the operation server by a variety of communication channels.

Mobile communication devices as described herein can use both the long-range radio of the telecommunication provider network and short range radio using proximity coupling technology to establish independent channels for communication with the operation server, supporting a wide variety of transactions and applications for transferring value. Furthermore, the architecture supports strong, two-factor security using both the long range and short range communication channels to protect the customers stored value accounts.

The payment architecture as described herein supports multiple electronic currencies among different business chains, telecom operators, internet service providers, and payment service providers. A 1:1 ratio is shown in several of the preceding embodiments. Different ratios other than 1:1 are also supported to reflect differing underlying contractual payment agreements among the business chains, telecom operators, internet service providers, and payment service providers. The transaction operations server automatically handles the process of currency exchange between multiple currencies issued among different business chains, telecom operators, internet service providers, and payment service providers. Accordingly, the payment architecture supports flexible commerce by allowing a user to add value to a mobile communication device in one business issued electronic currency and perform a transaction using the stored value with a separate business group that issues another electronic currency.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A mobile communication device including a data processing system supporting mobile payment, comprising:
a data processor, including program storage storing programs including instructions executable by the data processor, and having data communication resources supporting a plurality of communication protocols including at least one protocol supported by a telecommunication provider network and at least one protocol for wireless proximity coupling;
said programs being adapted to maintain stored value in memory accessible by the data processor, to support authentication of the mobile communication device for communications with transaction terminals, to communicate with a transaction terminal via wireless proximity coupling, and to communicate with a server via the telecommunication provider network;
said programs including a program adapted to execute a transaction involving changing stored value on the mobile communication device, including:
storing data representing a stored value on the mobile communication device;
establishing a wireless link between the mobile communication device and a transaction terminal;
executing communications between the mobile communication device and the transaction terminal using the wireless link to change the stored value represented by the data stored on the mobile communication device according to a particular transaction;
passing a first record of the particular transaction from the mobile communication device to a transaction server via a first communication channel through the telephone service provider network for reconciliation with a second record of the particular transaction sent to the transaction server via a second communications channel through a communication network coupled to the transaction terminal, wherein the transaction server maintains a first account of a user of the mobile communication device in the first business issued currency, and a second account of a merchant of the transaction terminal in the second business issued currency, and the transaction server handles the exchange between the first account in the first business issued currency and the second account in the second business issued currency,
wherein said particular transaction includes an exchange between a first business issued currency honored by a first group of one or more businesses and a second business issued currency honored by a second group of one or more businesses, the first group of one or more businesses honor the first business issued currency according to a first contractual agreement among the first group of one or more businesses such that nonparties to the first contractual agreement are not required to accept the first business issued currency, and the second group of one or more businesses honor the second business issued currency according to a second contractual agreement among the second group of one or more businesses such that nonparties to the second contractual agreement are not required to accept the second business issued currency.

2. The mobile communication device of claim 1, wherein said programs include a program enabling the data processor to communicate with another mobile communication device via wireless proximity coupling.

3. The mobile communication device of claim 1, wherein said programs include a program enabling the data processor to communicate with another mobile communication device via wireless proximity coupling, and to act as a transaction terminal receiving stored value from said another mobile communication device.

4. The mobile communication device of claim 1, wherein said programs include a program for composing and sending stored value audit records via the telecommunication provider network to the transaction server.

5. The mobile communication device of claim 1, wherein the change includes increasing the stored value represented by the data stored on the mobile communication device.

6. The mobile communication device of claim 1, wherein the change includes decreasing the stored value represented by the data stored on the mobile communication device.

7. The mobile communication device of claim 1, wherein the first communication channel comprises communications according to a protocol compliant with an industry standard Short Message Service protocol.

8. The mobile communication device of claim 1, wherein the second communication channel comprises communications according to a protocol compliant with an industry standard TCP/IP protocol.

9. The mobile communication device of claim 1, wherein the second communication channel comprises a public switched telephone network.

10. A method of a mobile communication device to execute transactions, comprising:
- the mobile communication device storing data representing a stored value in memory on the mobile communication device;
- the mobile communication device establishing a wireless link between the mobile communication device and a transaction terminal;
- the mobile communication device executing communications using a wireless proximity coupling link between the mobile communication device and a transaction terminal to authenticate the mobile communication device and to change the stored value represented by the data stored on the mobile communication device according to a particular transaction involving changing stored value on the mobile communication device;
- the mobile communication device passing a first record of the particular transaction from the mobile communication device to a transaction server via a first communication channel through the telephone service provider network for reconciliation with a second record of the particular transaction sent from the mobile communication device to the transaction server via a second communications channel through a communication network coupled to the transaction terminal, wherein the transaction server maintains a first account of a user of the mobile communication device in the first business issued currency, and a second account of a merchant of the transaction terminal in the second business issued currency, and the transaction server handles the exchange between the first account in the first business issued currency and the second account in the second business issued currency,
- wherein said particular transaction includes an exchange between a first business issued currency honored by a first group of one or more businesses and a second business issued currency honored by a second group of one or more businesses, the first group of one or more businesses honor the first business issued currency according to a first contractual agreement among the first group of one or more businesses such that nonparties to the first contractual agreement are not required to accept the first business issued currency, and the second group of one or more businesses honor the second business issued currency according to a second contractual agreement among the second group of one or more businesses such that nonparties to the second contractual agreement are not required to accept the second business issued currency.

11. The method of claim 10, further comprising:
- the mobile communication device communicating with another mobile communication device via wireless proximity coupling.

12. The method of claim 10, further comprising:
- the mobile communication device communicating with another mobile communication device via wireless proximity coupling; and
- the mobile communication device acting as a transaction terminal receiving stored value from said another mobile communication device.

13. The method of claim 10, further comprising:
- the mobile communication device composing and sending stored value audit records via the telecommunication provider network to the transaction server.

14. The method of claim 10, wherein the change includes increasing the stored value represented by the data stored on the mobile communication device.

15. The method of claim 10, wherein the change includes decreasing the stored value represented by the data stored on the mobile communication device.

16. The method of claim 10, wherein the first communication channel comprises communications according to a protocol compliant with an industry standard Short Message Service protocol.

17. The method of claim 10, wherein the second communication channel comprises communications according to a protocol compliant with an industry standard TCP/IP protocol.

18. The method of claim 10, wherein the second communication channel comprises a public switched telephone network.

19. A memory with program instructions for a mobile communication device to execute transactions, the program instructions comprising:
- the mobile communication device storing data representing a stored value in memory on the mobile communication device;
- the mobile communication device establishing a wireless link between the mobile communication device and a transaction terminal;
- the mobile communication device executing communications using a wireless proximity coupling link between the mobile communication device and a transaction terminal to authenticate the mobile communication device and to change the stored value represented by the data stored on the mobile communication device according to a particular transaction involving changing stored value on the mobile communication device;
- the mobile communication device passing a first record of the particular transaction from the mobile communication device to a transaction server via a first communication channel through the telephone service provider network for reconciliation with a second record of the particular transaction sent from the mobile communication device to the transaction server via a second communications channel through a communication network coupled to the transaction terminal, wherein the transaction server maintains a first account of a user of the mobile communication device in the first business issued currency, and a second account of a merchant of the transaction terminal in the second business issued currency, and the transaction server handles the exchange between the first account in the first business issued currency and the second account in the second business issued currency,
- wherein said particular transaction includes an exchange between a first business issued currency honored by a first group of one or more businesses and a second business issued currency honored by a second group of one or more businesses, the first group of one or more businesses honor the first business issued currency according to a first contractual agreement among the first group of one or more businesses such that nonparties to the first contractual agreement are not required to accept the first business issued currency, and the second group of one or more businesses honor the second business issued currency according to a second contractual agreement among the second group of one or more businesses such that nonparties to the second contractual agreement are not required to accept the second business issued currency.

20. The device of claim 1, wherein the program adapted to execute the transaction passes the first record of the particular transaction to the transaction server via the first communication channel, and the second record of the particular transaction to the transaction server via the second communication channel, and wherein the transaction server is linked with a banking network, and transfers value between the first account of the user and a user banking account on the banking network, and transfers value between the second account of the merchant and a merchant banking account on the banking network.

21. The method of claim 10, wherein the mobile communication device passes the first record of the particular transaction to the transaction server via the first communication channel, and the mobile communication device sends the second record of the particular transaction to the transaction server via the second communication channel, and wherein the transaction server is linked with a banking network, and transfers value between the first account of the user and a user banking account on the banking network, and transfers value between the second account of the merchant and a merchant banking account on the banking network.

22. The memory of claim 19, wherein the program instructions comprise the mobile communication device passing the first record of the particular transaction to the transaction server via the first communication channel, and the mobile communication device sending the second record of the particular transaction to the transaction server via the second communication channel, and wherein the transaction server is linked with a banking network, and transfers value between the first account of the user and a user banking account on the banking network, and transfers value between the second account of the merchant and a merchant banking account on the banking network.

* * * * *